(12) United States Patent
Moon et al.

(10) Patent No.: US 7,356,451 B2
(45) Date of Patent: Apr. 8, 2008

(54) ASSERTION HANDLING FOR TIMING MODEL EXTRACTION

(75) Inventors: Cho Woo Moon, San Diego, CA (US); Harish Kriplani, Saratoga, CA (US); Krishna Prasad Belkhale, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 722 days.

(21) Appl. No.: 10/313,247

(22) Filed: Dec. 6, 2002

(65) Prior Publication Data

US 2003/0120474 A1    Jun. 26, 2003

Related U.S. Application Data

(60) Provisional application No. 60/339,235, filed on Dec. 7, 2001.

(51) Int. Cl.
  *G06F 17/50* (2006.01)
  *G06F 9/45* (2006.01)

(52) U.S. Cl. ............... 703/19; 716/4; 716/5; 716/6; 716/18

(58) Field of Classification Search ............... 703/19; 716/4–6, 18
See application file for complete search history.

(56) References Cited

U.S. PATENT DOCUMENTS

| | | | |
|---|---|---|---|
| 5,469,367 A | | 11/1995 | Puri et al. |
| 5,508,937 A | * | 4/1996 | Abato et al. ............... 716/6 |
| 5,535,145 A | | 7/1996 | Hathaway |
| 5,581,473 A | * | 12/1996 | Rusu et al. ............... 716/6 |
| 5,657,239 A | * | 8/1997 | Grodstein et al. ............. 716/6 |
| 5,778,216 A | * | 7/1998 | Venkatesh ............... 713/503 |
| 5,790,830 A | | 8/1998 | Segal |
| 5,796,621 A | | 8/1998 | Dudley et al. |
| 5,923,564 A | | 7/1999 | Jones, Jr. |
| 5,946,475 A | * | 8/1999 | Burks et al. ............... 716/6 |
| 6,158,022 A | | 12/2000 | Avidan |

(Continued)

FOREIGN PATENT DOCUMENTS

WO    WO 01/08028 A2    2/2001

OTHER PUBLICATIONS

"PrimeTime Tutorial" version 1999.10, Oct. 1999, Synopsys, 89 pages.*
R.G. Bushroe, S.DasGupta, A. Dengi, P. Fisher, S. Grout, G. Ledenbach, Nagaraj NS, R. Steel, "Chip Hierarchical Design System (CHDS): A Foundation for Timing-driven Physical Design into the 21st Century" ISPD 1997, pp. 212-217.*

(Continued)

*Primary Examiner*—Paul Rodriguez
*Assistant Examiner*—Dwin McTaggart Craig
(74) *Attorney, Agent, or Firm*—Bingham McCutchen LLP

(57) ABSTRACT

Disclosed is a method and system for handling timing constraints or assertions for timing model extraction. One disclosed approach for assertion handling is by automatically preserving the integrity of original assertions by retaining existing pins or creating new internal pins. The assertions are viewed as part of the model, and a set of new assertions are generated automatically as part of the timing model extraction process and can be stored as part of the model. Assertions can be associated with input ports, output ports, internal pins, or hierarchical pins and can even span multiple blocks. This disclosed approach allows for application of assertions associated with timing models when the model is instantiated and detachment of assertions when the model is de-instantiated, and thus removes one of main problems associated with timing models.

61 Claims, 19 Drawing Sheets

U.S. PATENT DOCUMENTS

| | | | |
|---|---|---|---|
| 6,212,665 B1* | 4/2001 | Zarkesh et al. | 716/4 |
| 6,247,165 B1* | 6/2001 | Wohl et al. | 716/5 |
| 6,421,818 B1 | 7/2002 | Dupenloup et al. | |
| 6,539,536 B1 | 3/2003 | Singh et al. | |
| 6,591,407 B1 | 7/2003 | Kaufman et al. | |
| 6,609,233 B1 | 8/2003 | Foltin et al. | |
| 6,928,630 B2* | 8/2005 | Moon et al. | 716/6 |
| 2003/0009734 A1 | 1/2003 | Burks et al. | |
| 2004/0078767 A1 | 4/2004 | Burks et al. | |

OTHER PUBLICATIONS

Gregory A. Northrop, Pong-Fei Lu, "A Semi-Custom Design Flow in High-Performance Microprocessor Design" ACM Jun. 18-22, 2001, pp. 426-431.*

David Blaauw, Rajendran Panda, Abhijit Das, "Removing user-specified false paths from timing graphs", ACM, 2000, pp. 270-273.*

Cherry, James J., "Pearl: A CMOS Timing Analyzer", 25$^{th}$ ACM/IEEE Design Automation Conference, 1988, pp. 148-153.

Venkatesh, S.V. et al., "Timing Abstraction of Intellectual Property Blocks", IEEE 1997 Custom Integrated Circuits Conference, 1997, pp. 99-102.

McDonald, Clayton B. et al., "A Symbolic Simulation-Based Methodology for Generating Black-Box Timing Models of Custom Macrocells", ICCAD, 2001, pp. 501-506.

Visweswariah, Chandu et al., "Formulation of Static Circuit Optimization with Reduced Size, Degeneracy and Redundancy by Timing Graph Manipulation", ICCAD, 2000, pp. 244-251.

Moon, C.W. et al. "Timing Model Extraction of Hierarchical Blocks by Graph Reduction" Proceedings 2002 Design Automation Conference (IEEE Cat: No. 02CH37324) Proceedings of 39$^{th}$ Design Automation Conference, New Orleans, LA, USA, Jun. 10-14, 2002, pp. 152-157.

* cited by examiner

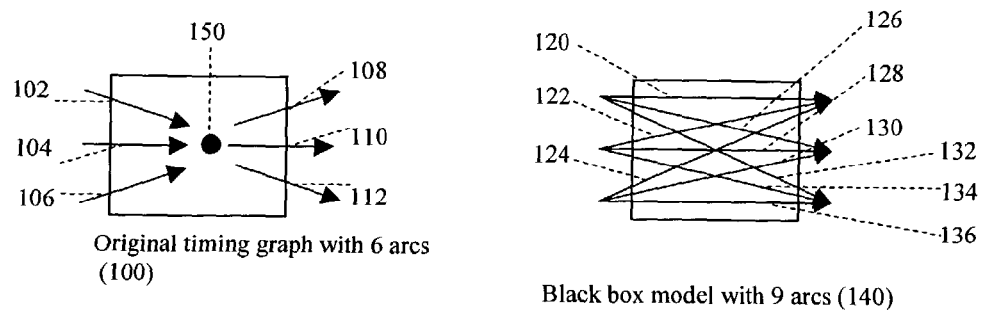
Original timing graph with 6 arcs (100)
Black box model with 9 arcs (140)
Figure 1
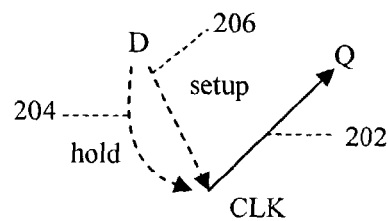
Figure 2a
| CLK | Q | Transition |
|---|---|---|
| Rising | Rising | True |
| Rising | Falling | True |
| Falling | Rising | False |
| Falling | Falling | False |
Figure 2b

```
removePin(pin){
  if (!canRemovePin(pin)) {
     retainPin(pin);                                          ⎫
     return 0;                                                ⎬ 472
  }                                                           ⎭
  for each incoming delay arc d1 to pin {
     for each outgoing delay arc d2 from pin {
        d3 = s-merge(d1, d2);                                 ⎫
        for each delay arc d parallel to d3 {                 ⎬ 474
          p-merge(d3, d);                                     
          delete d;                                           ⎭
     } }
     for each check arc c1 having pin as sig {
        c3 = backward-s-merge(d1, c1);                        ⎫
        for each check arc c parallel to c3 {                 ⎬ 476
          p-merge(c3, c);                                     
          delete c;                                           ⎭
     } }
     for each check arc c2 having pin as ref {
        c4 = forward-s-merge(d1, c2);                         ⎫
        for each check arc c parallel to c4 {                 ⎬ 478
          p-merge(c4, c);                                     
          delete c;                                           ⎭
  } } }
  delete pin;
  return 1;
}
```

Figure 4c

```
retainPin(pin) {
   for each incoming delay arc d of pin {
      compute_delay (d);
   }
   combine all incoming input slews at pin;
   for each outgoing delay arc d from pin {
      compute_delay(d);
} }
```

| arc1 | | |
|---|---|---|
| Input Slew | Output Slew | Arc Delay |
| is1 | os1 | d1 |

502

| arc2 | | |
|---|---|---|
| Input Slew | Output Slew | Arc Delay |
| os1 | os2 | d2 |

504

| arc3 | | |
|---|---|---|
| Input Slew | Output Slew | Arc Delay |
| is1 | os2 | d1 + d2 |

506

| arc1 | | |
|---|---|---|
| Input Slew | Output Slew | Arc Delay |
| is1 | os1 | d1 |

602

| arc2 | | |
|---|---|---|
| Input Slew | Output Slew | Arc Delay |
| is1 | os2 | d2 |

604

| arc1 | | |
|---|---|---|
| Input Slew | Output Slew | Arc Delay |
| is1 | os2 | d2 |

606

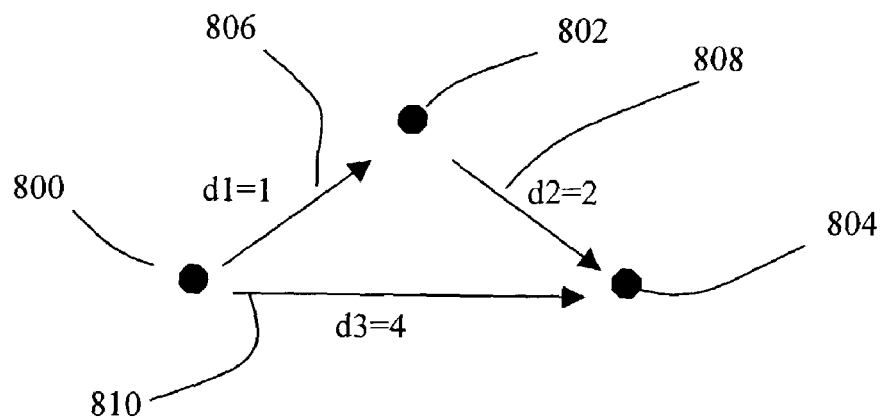
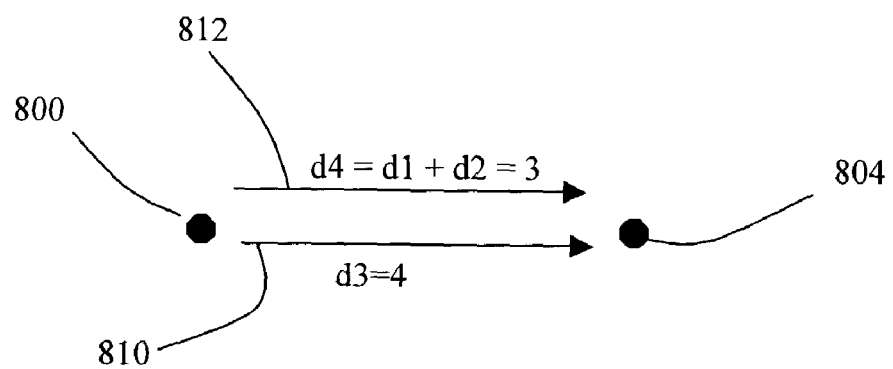
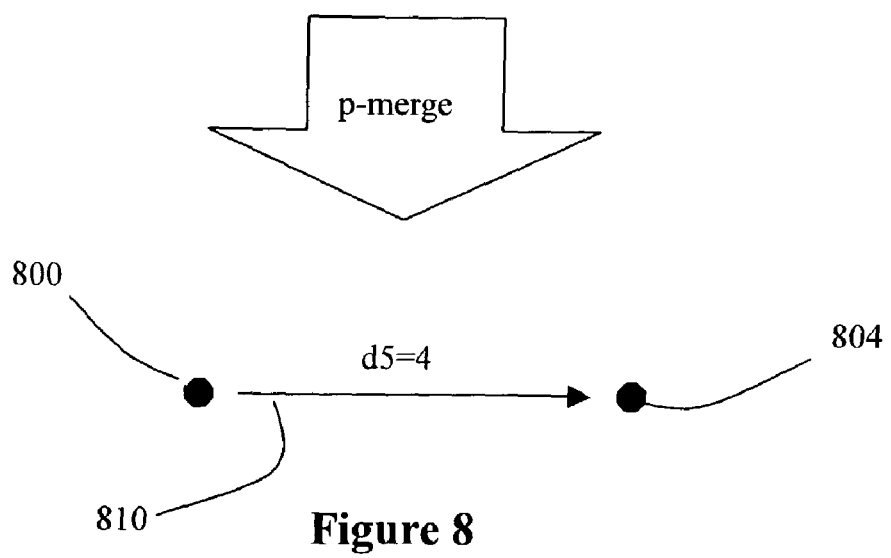
Figure 8

```
expandGraphForHierarchicalPins(graph) {
  initialize map_table;
  for each timing pin in graph {
    initialize visited;
    for each delay arc emanating from pin {
      this_arc = arc;
      for each hierarchical pin hpin with assertions on this_arc {
        internal_pin =
          findOrCeateInternalPin(hpin, visited, map_table);
        this_arc = splitDelayArc(internal_pin, this_arc);
      }
    delete visited;
    }
  }
} findOrCreateInternalPin(hpin, visited, map_table)
{
  if (hpin already exists in visited) {
    return the internal_pin stored in visited for hpin;
  }
  create a new internal_pin;
  add a mapping from hpin to internal_pin in visited;
  add an entry that associates hpin to internal_pin in map_table;
  return internal_pin;
} splitDelayArc(internal_pin, arc)
{
  create a zero delay and slew-preserving arc
    from source of arc to internal_pin;
  create a delay arc new_arc with the same delay characteristics as arc
    from internal_pin to sink of arc;
  return new_arc;
}
```

Figure 12

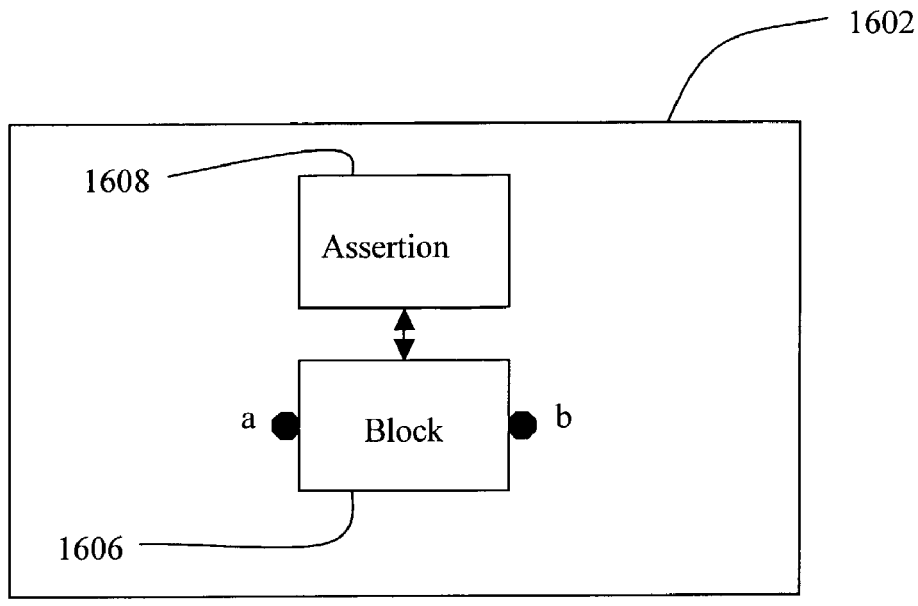
Assertion = set_false_path -from a -to b
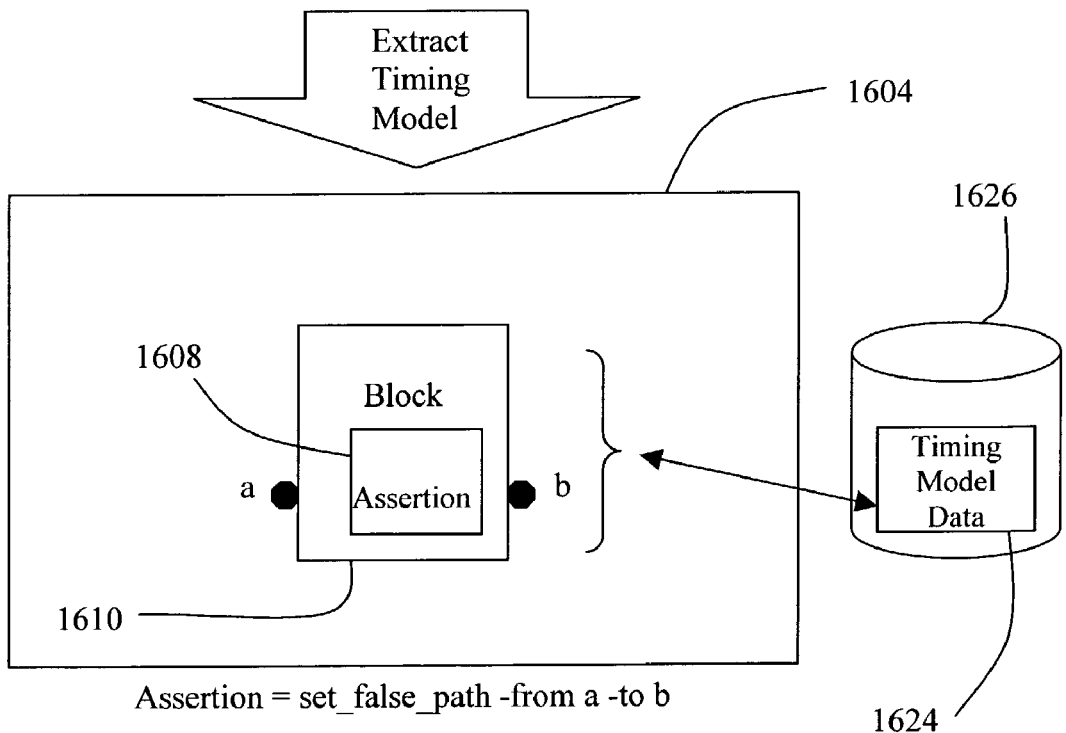
Assertion = set_false_path -from a -to b
Figure 16

ASSERTION HANDLING FOR TIMING MODEL EXTRACTION

CROSS-REFERENCE TO RELATED APPLICATION

The present application claims priority to U.S. Provisional Application Ser. No. 60/339,235, filed Dec. 7, 2001, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all other copyright rights.

BACKGROUND

The invention relates to the field of electrical circuit design, and more particularly, to the field of timing model extraction.

Timing extraction or block characterization refers to the process of creating a timing model of a digital circuit for use with a timing analyzer, e.g., a static timing analyzer. Timing extraction plays an important role in hierarchical top-down flow and bottom-up IP authoring flow by reducing the complexity of timing verification and by providing a level of abstraction which hides the implementation details of IP blocks. Three desired features in timing extraction are accuracy, efficiency, and usability.

The extracted model should preserve the timing behavior of the original circuit and produce accurate results including correct transparent latch behaviors and timing violations. The model also needs to be efficient in terms of the resources needed to generate the model and in terms of the final model size. The model should also be easy to use with existing static timing analyzers. This includes model instantiation, translation of original timing constraints and easy-to-follow timing reports.

Timing model can often be classified into two types: black box model and gray box model. Black box models have no internal visibility into the block—all the timing information relates to the pins at the boundary of the block. Gray box models, on the other hand, have internal pins that allow for modeling behaviors like time borrowing across multiple latches. Such internal pins provide advantages such as capability to reduce model size and capability to apply original timing constraints or assertions.

In one approach for implementing a black box model, users supply a set of input slew values and output load values and the tool performs path tracing to determine all port-to-port path delays and relevant timing checks. Although black box models have been widely used, they suffer from significant drawbacks. For example, tracing each possible path in the timing graph is a potentially complex task that could consume a significant amount of computing resources—often requiring a full timing analysis process to extract a model. Moreover, the resulting model size in this approach may actually end up larger than the original timing graph size. This is illustrated in FIG. 1, in which path tracing is employed to derive a black box model 140 from a timing graph 100. In this approach, every potential path is identified by tracing from an individual input port to an individual output port. Thus, the path through arc 102 and arc 108 in the original timing graph 100 is traced through pin 150 to form path 120 in the black box model 140. Tracing each possible path results in nine arcs or paths in the resulting timing model 140 (arcs 120, 122, 124, 126, 128, 130, 132, 134, and 136). As can be seen, there are only six arcs in the original timing graph 100 (arcs 102, 104, 106, 108, 110, and 112). Thus, the black box model 140 is actually larger than the original timing graph 100.

Another drawback with known black box models is that only limited latch behavior can be modeled. The model can capture the latch time borrowing behavior of the original netlist for some given clock waveforms. If the clock waveforms change after the model is extracted, the model becomes invalid. Moreover, support for assertions in black box models is limited, even for those assertions that are fully contained in the block. Only assertions that originate from and terminate at boundary ports can be fully supported. For example, multi cycle paths that do not originate from or terminate at boundary ports cannot be supported. Also, assertions that span multiple blocks cannot be supported. For example, consider a multi cycle path that originates from block A and terminates in the middle of block B. The black box model for block B cannot support this multi cycle path assertion.

Approaches to gray box modeling also suffer from drawbacks. Conventional gray box approaches cannot adequately handle arbitrary levels of transparency in latches. Latches may be transformed to registers or combinational gates but such transformations could lead to models that are too conservative and do not allow for time borrowing. One approach provides latch path compression work that collapses latch paths instead of individual latches, in which the extent of compression is controlled by specifying the desired level of latch transparency. However, this approach cannot guarantee a reduction in model size and in some cases, the model size actually increases after latch path compression. Moreover, the method does not scale well with the number of latch paths or with the level of latch transparency.

SUMMARY

Disclosed is a method and system to generate a timing model by reducing the timing graph. The method can generate a model that is accurate within a specified tolerance and is very efficient. Also described is an approach for preserving and applying timing constraints/assertions to a model. In one embodiment, the timing constraints/assertions are viewed as part of the model, and a set of new timing constraints can be generated is automatically applied as part of the model extraction process. Latch time borrowing and support for the application of original assertions can be accomplished by retaining some internal pins. Further and additional objects, details, and advantages of the invention are described in the figures and text below.

BRIEF DESCRIPTION OF FIGURES

FIG. 1 illustrates a problem with existing blackbox modeling methods.

FIG. 2a depicts an example timing graph.

FIG. 2b shows an example transition matrix for the circuit of FIG. 2a.

FIGS. 4a-c show examples of pseudo code for implementing graph reduction according to an embodiment of the invention.

FIG. 8 depicts a process for reducing a circuit portion according to an embodiment of the invention.

FIG. 12 illustrates handling of hierarchical pin assertions according to an embodiment of the invention.

FIG. 16 depicts an alternate approach to assertion handling for model extraction in an embodiment of the invention.

DETAILED DESCRIPTION

Overview

Disclosed embodiments of the invention are directed to a method and system to generate a timing model by reducing the timing graph. The method can generate a model that is accurate within a specified tolerance and is very efficient. Also described is an approach for preserving and applying timing constraints/assertions to a model. In one embodiment, the timing constraints/assertions are viewed as part of the model, and a set of new timing constraints can be automatically generated as part of the model extraction process. Latch time borrowing and support for the application of original assertions can be accomplished by retaining some internal pins.

In an embodiment of the invention, model extraction is performed by simplifying the original timing graph. The simplification is accomplished by iteratively removing timing pins from the timing graph and combining timing arcs. This leads to a spectrum of models which allows for a tradeoff in model size and cpu/memory resources. For the sake of exposition, consider timing graph G as a three-tuple G=(P, D, C), where P is a set of pins, D a set of delay arcs and C a set of check arcs. Delay arcs and check arcs originate from and terminate at pins: $D \subseteq (P \times P)$, $C \subseteq (P \times P)$. Associated with each delay arc is a transition matrix which defines valid transitions between the source pin and the sink pin. Associated with each check arc is a transition matrix which defines valid rising or falling transitions between the signal pin and the reference pin. Each check arc has a type such as setup, hold, recovery, removal, etc. To illustrate the terminology and conventions used herein, an example timing graph representation of a simple D-type register is shown in FIG. 2a. Delay arc 202 is represented as a solid-line arrow and check arcs 204, 206 as dotted-line arrows. An example transition matrix for CLK→Q delay arc is shown in FIG. 2b. This matrix identifies transitional relationships between check arcs and delay arcs on input and output transitions. Delay/check values are associated with delay/check arcs. Delay or check values can be, for example, linear functions, lookup tables or delay equations.

Figure 3A:
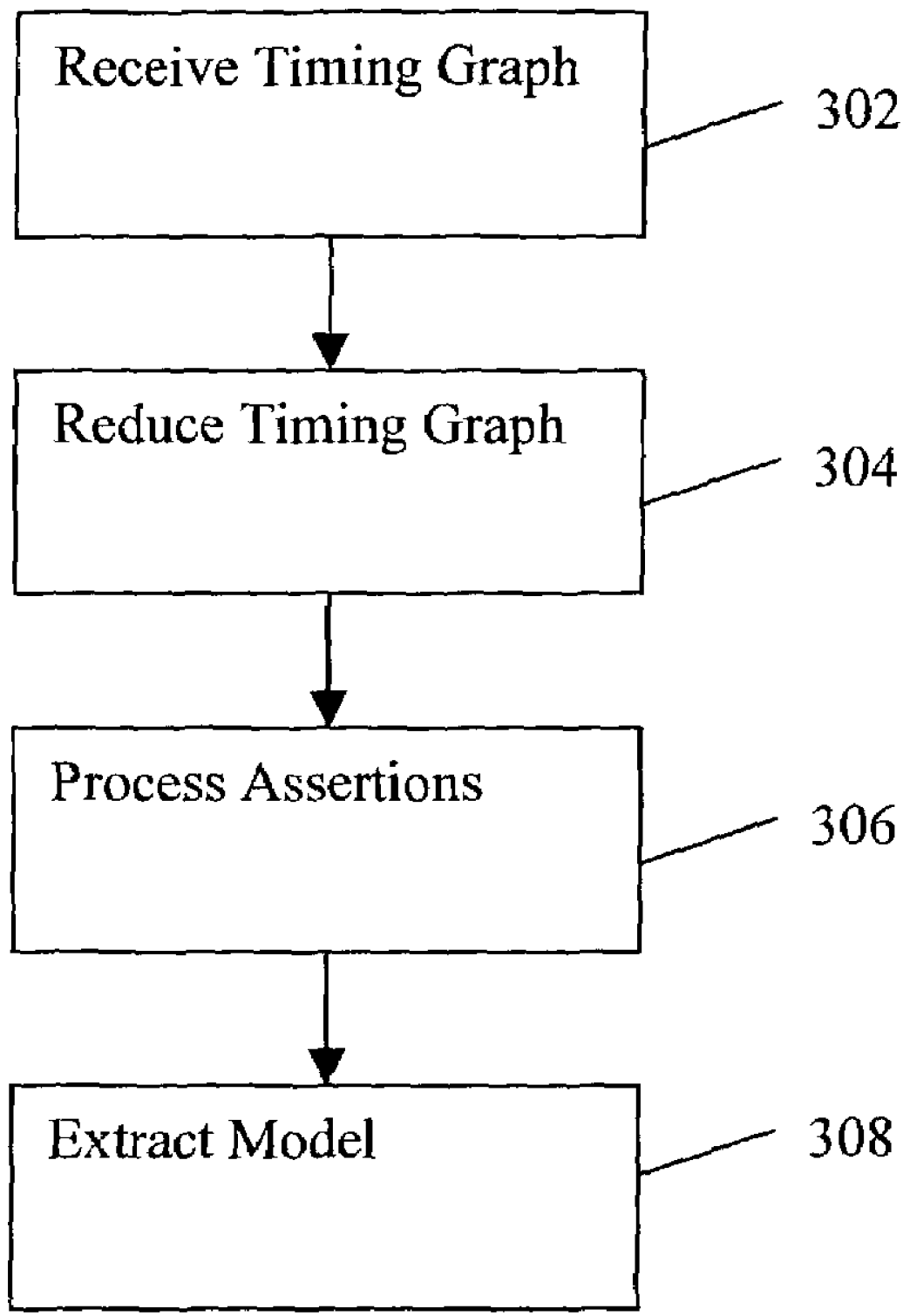
FIG. 3a shows a flowchart of an embodiment of a process for implementing model extraction.

FIG. 3a shows a high-level flowchart of a process for extracting a timing model according to an embodiment of the invention. At 302, a timing graph is received for processing. In one embodiment, this action is accomplished by copying the original timing graph generated by a timing engine to a new model graph. Any timing analysis tool can be employed to generate this timing graph, e.g., the BuildGates timing analysis tool available from Cadence Design Systems of San Jose, Calif. In one embodiment, the given timing graph is assumed to be cyclic. At 304, the model graph is reduced by removing timing pins and combining timing arcs. At 306, assertions within timing graph are automatically processed and reproduced in the extracted model. The assertions in the original circuit are automatically mapped to those in the model graph using internal pins, as described in more detail below. At 308, the timing model is extracted from the model graph.

Figure 3B:
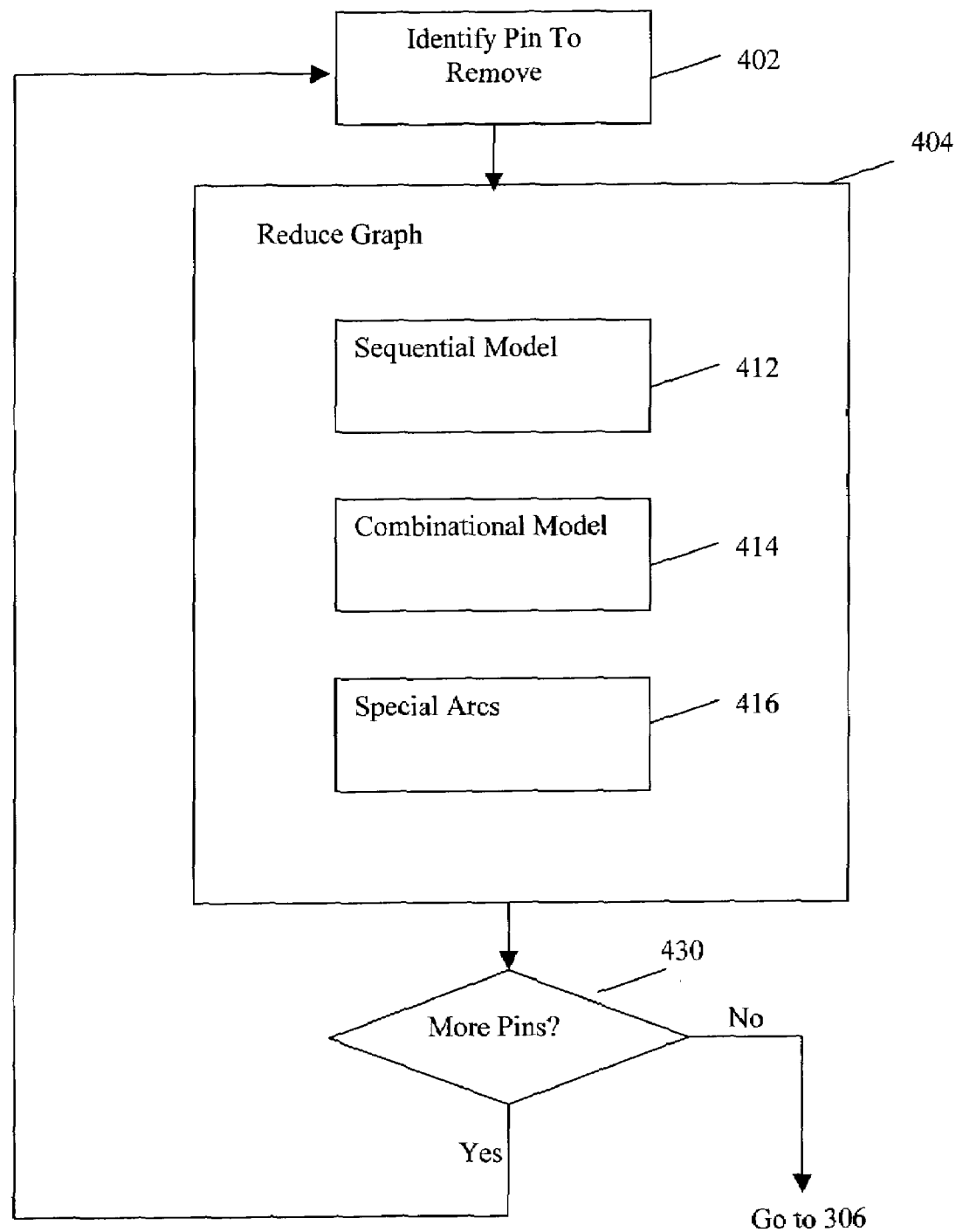
FIG. 3b shows a flowchart of an embodiment of a process for graph reduction.

FIG. 3b shows a flowchart of an embodiment of a process for implementing the model graph reduction action 304 of FIG. 3a. At 402, an identification is made of timing pins to process and of timing graph elements to exclude from the model reduction action. Examples of pins/elements to possibly exclude from reduction include anchor points, latch points, and assertion points. An anchor points are pins for which the model graph would become larger than the original timing graph if the anchor points were eliminated. The anchor pin is illustrated, for example, by pin 150 in FIG. 1. Latch points are excluded from reduction to ensure preservation of latch behavior. Examples of excluded latch points include the input and output pins, but not clock pins, of a latch element. Pins associated with an assertion or a constraint are excluded from reduction to preserve and apply original constraints.

At 404, the timing graph portion is processed for possible reduction, except with respect to the elements and pins identified for exclusion in 402. For the sake of exposition, timing models are divided into at least two parts comprising a combinational part that deals with interaction among delay arcs and are captured in the combinational model 412 and a sequential part that deals with interaction between delay arcs and check arcs that is captured in the sequential model 414. Special processes can also be defined to handle special types of arcs 416 that cannot be acceptably reduced using the standard models. For instance, a self-loop arc is an example of a special type of arc for which a separate process can be employed for reduction. The pins and arcs in the timing graph are processed with BFS (breadth first search) ordering until no further pins remain for processing (430). Multiple iterations of the reduction process may be performed to all or part of a timing graph.

The embodied timing model extraction process builds a timing model of a digital circuit for use with a static timing analyzer, in which a gray box timing model is generated from gate-level netlist by reducing the timing graph. This provides model accuracy including arbitrary levels of latch time borrowing, correct support for self-loop timing checks and capability to preserve original timing constraints. Also, cpu and memory resources required to generate the model scale well with size of the circuit.

The model extraction process is accurate, e.g., since the worst-case behavior of the original circuit is accurately preserved in the model. Any timing violation which occurs in the original circuit is reproducible in the model. Also, critical paths which change with respect to a change in input slew value are accurately reflected in the model. This provides better accuracy than prior approaches where critical paths are determined with one particular input slew value and later re-characterized for a combination of input slews and output load values. In addition, self-loop timing checks such as period and minimum pulse width checks are also preserved. Moreover, the model extraction process can be applied more efficiently, since in the embodied approach, extraction is based on a simple graph contraction rather than prior approaches that essentially required full-blown timing analysis to extract a model. Also, the model size can be reduced significantly, e.g., by retaining anchor points. Generating a gray box model also provides more visibility into the internal pins in the circuit as compared to black box modeling approaches. Internal pins allow for accurate modeling of latch timing borrowing behavior and register-to-register constraints. The embodied gray box model produces a model that is clock context independent—it is valid for clock waveforms different from the ones used to build the model. In an disclosed embodiment, path delays can be characterized with respect to input slews and output loads, while timing checks are characterized with respect to input slews and clock slews.

Figure 3C:
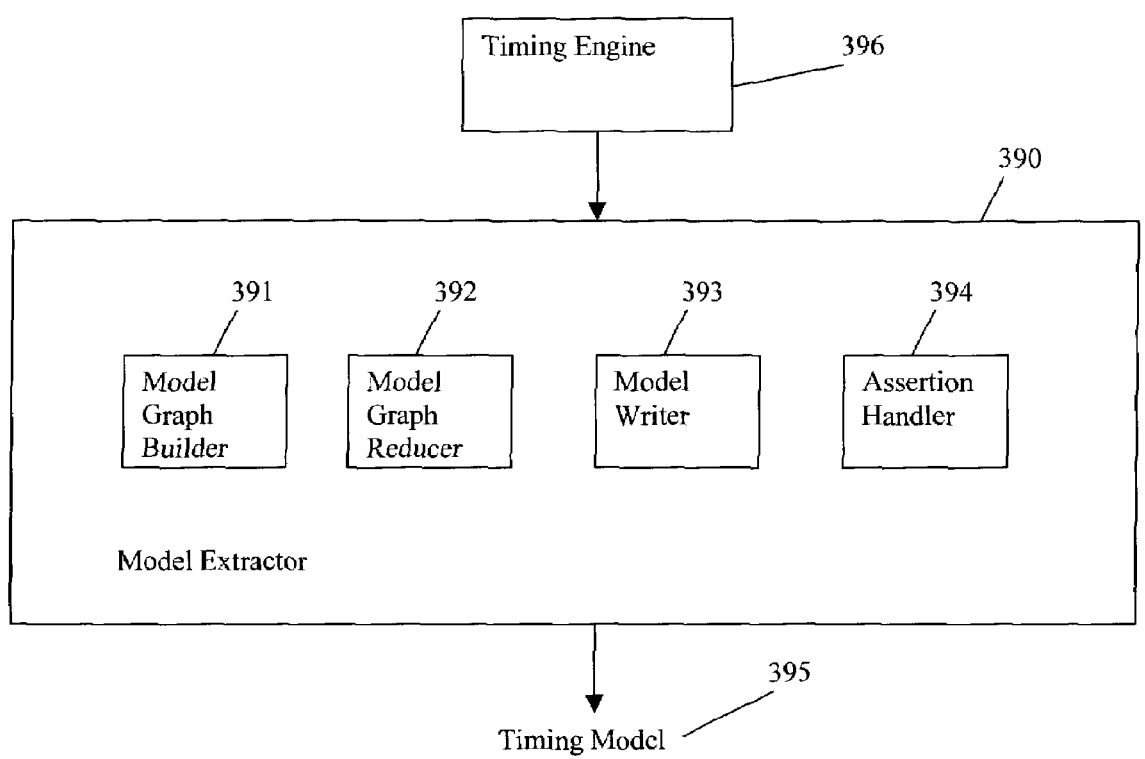
FIG. 3c depicts an embodiment of an architecture for model extraction.

FIG. 3c shows en embodiment of an architecture for a model extraction mechanism 390 according to the invention. The model extractor mechanism 390 comprises four functional components. The model graph builder 391 copies the original timing graph from the timing engine 396 to a new model graph. The model graph reducer 392 is the extractor's core engine that simplifies the model graph. The model writer 393 writes out a timing model from the reduced model graph. Assertion handler 394 takes care of original timing constraints. Each of these functional components is described in more detail below.

Model Graph Builder

This section describes an embodiment of a process and mechanism for building a model graph. In this approach, all check arcs in the original timing graph are added to the new model graph. Most or all of the delay arcs in the original timing graph are copied to model graph, for example: (a) latch D->Q flush arcs; and (b) clock gating arcs (all arcs from clock gate input pin to clock gate output pin). In this embodiment, delay arcs and check arcs that are disabled by constraints such as set_disable_timing are not included in the model graph.

The model graph consists of objects associated with pins, delay arcs, and check arcs. Each of these objects has a pointer to the corresponding object in the original timing graph. A BFS traversal routine is employed which returns an array of pins sorted in BFS order from inputs to outputs. In order to avoid introducing a cycle which was not present in the original timing graph, BFS graph traversal routine should take into account latch flush arcs and clock gating arcs.

Model Graph Reducer

FIG. 4a shows pseudocode for an embodiment of process and mechanism for performing graph reduction. In this approach, the timing graph is reduced one pin at a time by visiting each internal pin in breadth first search (BFS) order. The reduction is repeated until no further changes are possible. Reasons for using BFS traversal include ensuring that incoming delay arcs to a pin have already been processed before the pin is removed, and that the delay arcs are characterized with respect to a minimum number of input slew values. removePin( ) is the main routine which performs the merge operations. The postProcess( ) routine takes care of delay arcs or check arcs which originate from primary input pins (or preserved internal pins) and terminate at primary output pins (or preserved internal pins). For such arcs, delay computation routines can be explicitly since no pin removal is performed for such arcs.

Pseudocode for an embodiment of the removePin( ) routine is shown in FIG. 4b. Section 472 makes the determination whether a particular pin should be removed from the model or excluded from the reduction process. Pseudocode for an embodiment of the retainPin( ) routine of section 472 is shown in FIG. 4c. Sections 474, 476, and 478 contain pseudocode for reducing the subject portion of the timing graph. For the sake of exposition, timing models can be divided into at least two parts. A combinational part deals with interaction among delay arcs and are captured in the combinational model. A sequential part deals with interaction between delay arcs and check arcs and are captured in the sequential model. Section 474 of the pseudo code in FIG. 4b is directed at reducing combinational models using the "s-merge" and "p-merge" operations. Section 476 is directed at reducing sequential models using the "backward-s-merge" operation. Section 478 is directed at reducing sequential models using the "forward-s-merge" operation. Each of these operations are described in more detail below.

Identifying Timing Graph Elements to Reduce or to Exclude from Reduction

This section describes an embodiment of a process and mechanism for determining whether a particular timing graph element should be included or excluded from the model reduction process.

The pins and arcs in the timing graph are processed with BFS ordering until no further pins remain for processing. Each element is subject to reduction unless excluded from the reduction process. Timing graph elements may be excluded from eligibility for reduction for a variety of reasons, such as to preserve certain identified types of behaviors/information in the resulting timing model or to ensure that the reduction process does not detrimentally increase the size of the timing model. The present approach may use heuristics to avoid blowup in model size such that the model size will be smaller than or equal to the original circuit size.

A first set of example elements of a timing graph element to exclude from reduction are timing pins for latches. Excluding the latch timing pins from removal in the timing model is helpful for preserving latch behavior. This occurs in part because the sense of transparency associated with latches can be useful for "time-borrowing", which is preserved if the input and output pins for a latch element are excluded from the reduction process. In is noted that in a present embodiment, the clock pin for a latch is not excluded from eligibility for reduction. Latch points can be identified by a number of techniques, including accessing structure information in the design or by analysis of latch profiles in the timing graph. Latch-based designs with many latch-to-latch connections are expected to benefit most from this optimization.

Other such pins can be excluded from reduction to preserve original timing behavior. Examples of such pins include: latch input pins, latch output pins, gated clock output pins, gated clock input pins, pins associated with assertions, and pins associated with output-to-output paths.

When pins are preserved, the slew values coming from input delay arcs to the pin are used to compute delay across the arcs originating from the pin. Pins associated with output-to-output paths refer to all internal pins fed by a "net pin". A net pin is a pin which connects to a primary output ("PO") port via a net arc. This preservation is used to capture the correct output loading dependency on output-to-output paths and to account for the correct delay across net arcs.

As another example, timing pins associated with assertions can also excluded from reduction. As explained in more detail below, assertions can be directly embedded into the timing model and associated with individual timing model elements. Excluding these elements from eligibility for reduction is helpful in retaining the association between an assertion and its associated timing graph element.

The goal of model extraction is to produce a model which is smaller than the original circuit. However, in some cases, removal of certain timing pins leads to a geometric blowup in the number of timing arcs. "Anchor points" refer to existing pins (e.g., internal pins) which, if removed, may lead to an increase in model size. To avoid having the timing model become larger than the original timing graph, such anchor points can be excluded from the reduction process. The number of delay arcs can be used to estimate the model size. In this approach, it is assumed that all the delay arcs make equal contribution to the final model size. Given this assumption, the identification of anchor points is similar to the problem of finding a set of pruning pins in the context of static circuit optimization. The objective is to minimize the number of delay arcs, not the number of variables. Also, since it is desirable to characterize the delay arcs with respect to a minimum number of input slew values, this approach will not remove internal pins at random without first processing their incoming delay arcs. This constrains the order in which anchor points are identified and retained.

To identify anchor points, a Gain value is determined for a pin as follows:

Gain=(#incoming delay arcs×#outgoing delay arcs)−
incoming delay arcs−#outgoing delay arcs.

This value represents an increase in the number of delay arcs if the pin is removed. In one embodiment, any pin that has a positive gain and is observable is a candidate for an anchor point. A pin is observable if there exists a path from the pin to a primary output or to a preserved pin. In this approach, observability prevents anchor points from being formed in the transitive fanin cone of pins that will eventually be removed. For example, register input pins are not observable and may be eventually removed.

For example, in FIG. 1, there are six delay arcs in the original timing graph 100 before removal of the internal pin 150 (i.e., arcs 102, 104, 106, 108, 110, and 112). If the pin 150 is removed, the number of delay arcs becomes nine (i.e., arcs 120-136), leaving a gain of 3. This gain value can be identified using the above equation in which the number of incoming delay arcs is equal to three (arcs 102, 104, and 106) and the number of outgoing delay arcs is also equal to three (arcs 108, 110, and 112). Thus, Gain=((3×3)−3−3))=3 for pin 150. Therefore, since the gain value for internal pin 150 exceeds zero, pin 150 can be considered an anchor point that is excluded from the reduction process.

Once anchor points are identified, they are valid for a particular pass. One pass constitutes a complete sweep of all internal pins. Anchor points should be re-identified in the subsequent passes.

The threshold gain value for determination of an anchor point can be adjusted to obtain or vary performance expectations. With a high enough value for the gain threshold, all anchor points can be removed from the design. The maximum number of anchor points is identified by setting the gain threshold to a value of "1". To ensure that the resultant timing model will not exceed to the size of the original timing graph, the gain threshold value can be set to 1.

It may happen that when the gain threshold is set to a high value, the number of delay becomes smaller than that for a smaller gain threshold although the final model size is larger. This happens because some delay arcs are "denser" than others in terms of transition matrix. This occurs because the assumption that all delay arcs make equal contribution to the final model size is not necessarily valid beyond the local scope. However, this does not affect the cost computation associated with anchor points because the number of immediate incoming/outgoing delay arcs are viewed this approach, not all the delay arcs.

For a more global view, different density or weights of delay arcs are also taken into consideration when determining anchor points.

Reducing Combinational Models

This section describes an embodiment of an approach for implementing section 474 of FIG. 4b to process combinational models. Two operations in this approach for reducing the timing graph are the serial-merge ("s-merge") and the parallel-merge ("p-merge") operations.

In this embodiment, the s-merge operation takes two delay arcs (d1 and d2) in series and creates a new arc (d3) from the source of the first arc (d1) to the sink of the second arc (d2) to represent the "sum" of d1 and d2. s-merge is a fundamental reduction operation that allows removal of internal pins from a timing graph without losing accuracy. When s-merge is performed, a new arc delay for the merged arc is computed.

Figures 5A, 5B:
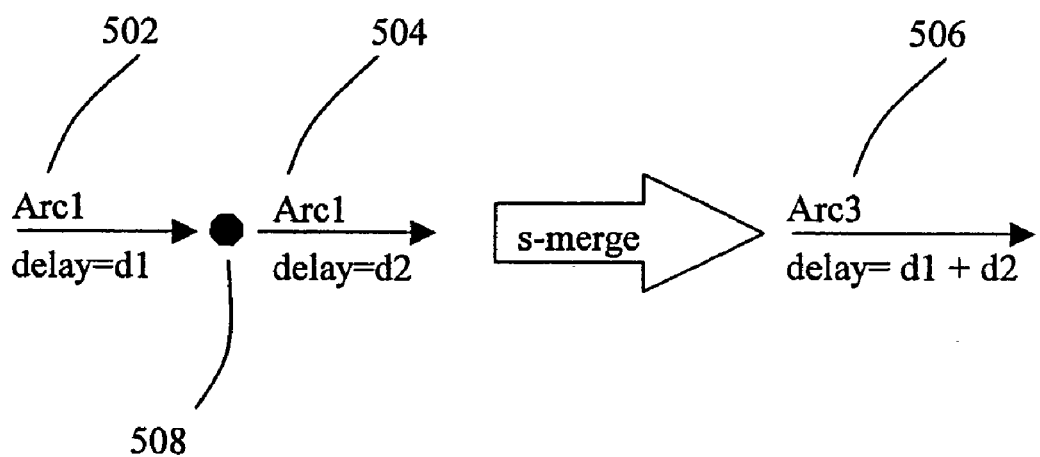
FIGS. 5a and 5b illustrate an serial merge (s-merge) operation according to an embodiment of the invention.

Referring to FIG. 5b, consider two arcs arc1 502 and arc2 504 which are in series across internal pin 508. Arc1 502 and arc2 504 have the delay values shown in FIG. 5a. These two arcs are serially merged by removing the internal pin 508. The new arc3 506 resulting from s-merge between arc1 502 and arc2 504 has a delay calculated by summing the individual delays for arc1 502 and arc 504.

Note that in this embodiment, a "lazy" slew computation is used so that output slew and arc delay are computed only for new input slew values which can lead to changes in delay and output slew values. Also, the load-dependent delay computation can be confined to the last arc that drives an output port.

Figures 6A, 6B:
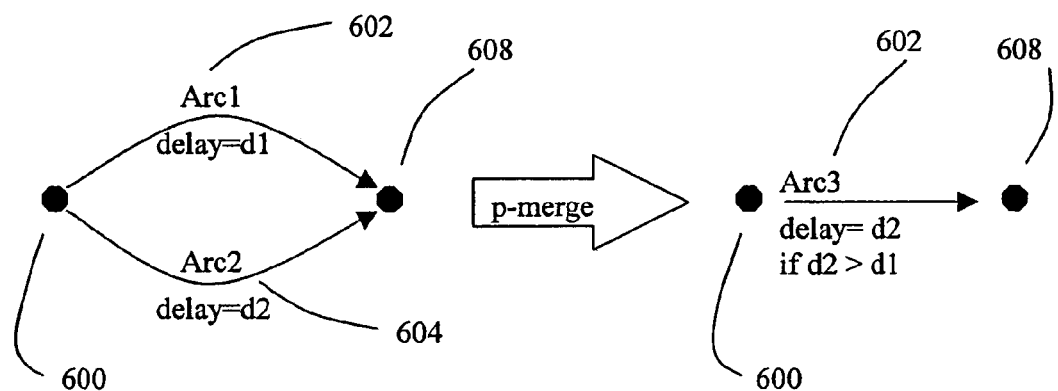
FIGS. 6a and 6b illustrate a parallel merge (p-merge) operation according to an embodiment of the invention.

The p-merge operation takes two parallel arcs and merges them into a single arc. The p-merge operation can lead to a substantial reduction in model extraction time as it reduces the number of arcs which need to be processed in the next stage of computation. In one embodiment, given two parallel delay arcs, p-merge chooses the "worst" of the two arcs and allows the other arc to be discarded Referring to FIG. 6b, consider two parallel arcs arc1 602 and arc2 604 that originate from pin 600 and end at pin 608. The delay values for these arcs are set forth in the tables of FIG. 6a. It is desired to merge the information from two arcs using a single arc3 602.

Assume that the arc delay d1 for arc1 602 is less than the arc delay d2 for arc2 604 (i.e., d1<d2). If a late path is of interest, then the p-merge action picks the output slew and arc delay from the worst-case arc, which in this example is arc2 604 since it has the greater arc delay value. If both early and late paths are of interest, then p-merge can pick up the worst early delay of d1 from arc1 602 and the worst late delay of d2 from arc2 604. The arc 602 will then have two delays after p-merge: early delay of d1 and late delay of d2.

In one embodiment, resultant arc3 606 is not a new arc—it is the arc selected to remain from the set of parallel arcs 602 and 604 to reduce in the p-merge process. Thus, for a p-merge operation conducted upon arcs 602 and 604, if the late path is of interest and it is assumed arc2 604 has a greater arc delay value than arc1 602, then after the p-merge process, arc1 602 is removed and only arc2 604 remains as the resultant arc3 606. In an alternate embodiment, arc3 606 is an entirely new arc formed with the required properties based upon the selected arc values to preserve based upon the p-merge operation.

Figure 7:
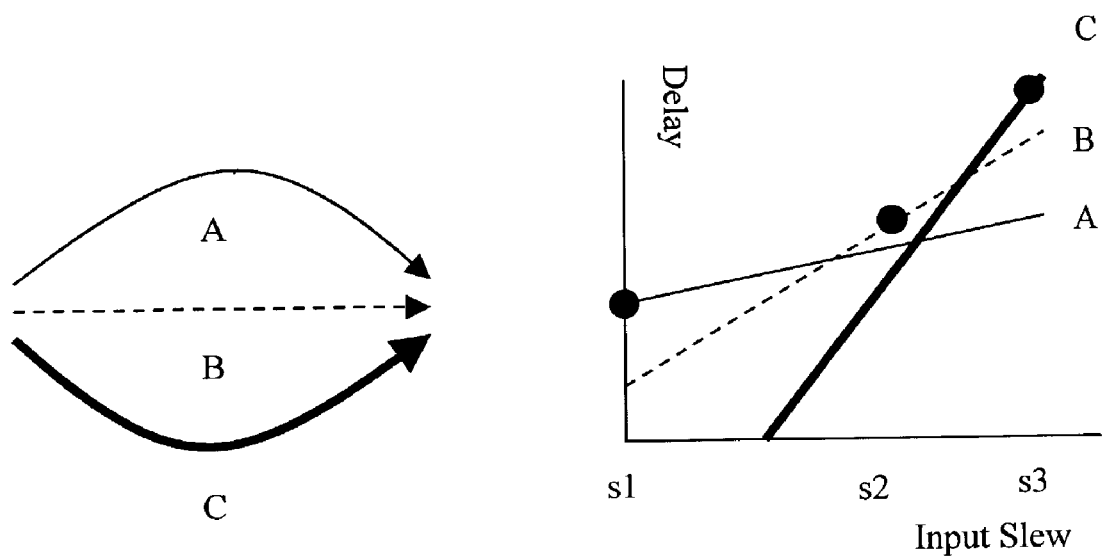
FIG. 7 illustrates that p-merge operation accurately reflects changes in critical path according to an embodiment of the invention.

Note that the p-merge operation can be configured to take into account critical paths that change due to a change in input slew values. Consider the timing graph in FIG. 7 where the critical path changes from A to B to C as input slew value changes from s1 to s2 to s3. The resulting arc delay after two p-merge operations correctly reflects the change in the critical path. Thus, the present approach is not locked into a particular critical path that is originally selected, but can dynamically determine the critical path, e.g., based upon a change in input slew value.

FIG. 8 illustrates the series of p-merge and s-merge actions that can be performed to reduce a portion of a timing graph. Initially, the timing graph portion includes a first timing pin 800 that has a delay arc 810 connected to a second timing pin 804. Another delay arc 806 extends from timing pin 800 to an internal timing pin 802. A delay arc 808 extends from internal timing pin 802 to timing pin 804.

It can be seen that delay arc 806 and delay arc 808 extend serially through internal timing pin 802. Therefore, the s-merge action can be performed to reduce these two arcs into a merged delay arc 812. If delay arc 806 has a delay value d1=1 and delay arc 808 has a delay value d2=2, then the delay value d4 for the s-merged arc 812 is equal to the sum of the two delay values (i.e., d4=d1+d2=1+2=3). After the s-merge operation, the internal timing pin 802 has been eliminated and the two delays arcs 806 and 808 has been merged into a single delay arc 812 having the delay value d4=3.

At this point, the merged delay arc 812 is in parallel with original delay arc 810, since both extend from the same input timing pin 800 to the same output timing pin 804. A p-merge operation can be performed to further reduce these two arcs into a single merged arc 810. If a late path is of interest, then the merged arc 810 is associated with the delay value for whichever arc 810 or 812 that has the greater delay value. Here since arc 810 has a greater delay value than its parallel arc 812, the merged arc 810 is associated with the delay value for arc 810 (i.e., delay value d5=(greater of d3 or d4)).

When the reduction operations have completed, the final timing model includes only a single delay arc and two timing pins, whereas there existed three delay arcs and three timing pins in the original timing graph portion.

It is noted that when merging is performed, e.g., either p-merge and s-merge, the associated transition matrixes may also change.

Sequential Models

This section describes an embodiment of an approach for implementing section 476 and 478 of FIG. 4b to process sequential models. Sequential models involve both delay arcs and check arcs. Check arcs can be classified into at least two main groups. One group is called the "setup" group where the data signal is expected to arrive before the reference or clock signal. Examples of "setup" group are setup, recovery, skew, clock separation, etc. The other group is called the "hold" group where the reference signal is expected to arrive before the data signal. Examples of "hold" group are hold and removal.

Registers or flip-flops are removed and, as noted above, part of latch information is retained to preserve latch behavior. In this embodiment, all latch input pins and latch output pins are retained. The operations associated with the removal of sequential elements are similar to those for combinational models. To correctly model the interaction between delay arcs and check arcs, two different s-merge operations are used: forward s-merge 478 and backward s-merge 476. Sequential p-merge is essentially the same as combinational p-merge. The difference is that only check arcs of the same type are merged.

A forward s-merge operation is used when register/latch clock pins are removed. When a delay arc and a check arc meet at a clock pin, a new check arc is created to represent a new check value between the old data signal (signal end of the check arc) and the new clock signal (source of the delay arc). Let d denote the delay value on the delay arc and c the check value on the check arc. In one embodiment, when merging the two arcs for the setup group the new check value becomes c−d and for the hold group, the new check value becomes c+d.

Figure 9:
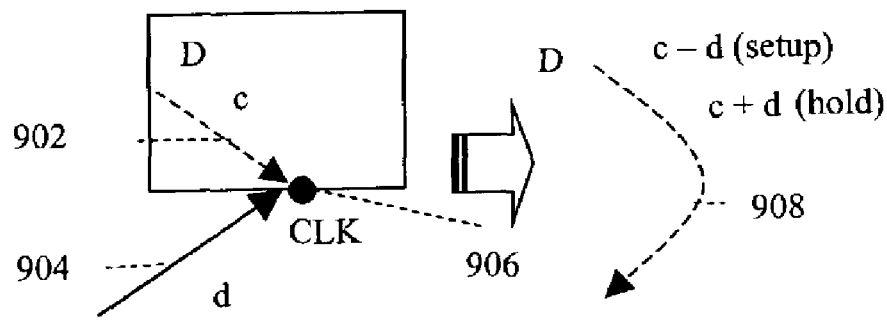
FIG. 9 shows a forward s-merge operation according to an embodiment of the invention.

FIG. 9 illustrates the forward s-merge operation. This figures shows the timing graph for a register in which a check arc 902 and a delay arc 904 are associated with a clock pin 906. The forward s-merge operation is used to reduce this timing graph by merging the two arcs and removing the clock pin 906. The merged arc 908 is a check arc having the check value c−d for setup group and c+d for hold group.

The backward s-merge operation is used when register input pins are removed. When a delay arc and a check arc meet at a data pin, a new check arc is created to represent a new check value between the source of the delay arc and the old clock signal (reference end of the check arc). For the setup group, the new check value becomes c+d and for the hold group, the new check value becomes c−d.

Figure 10:
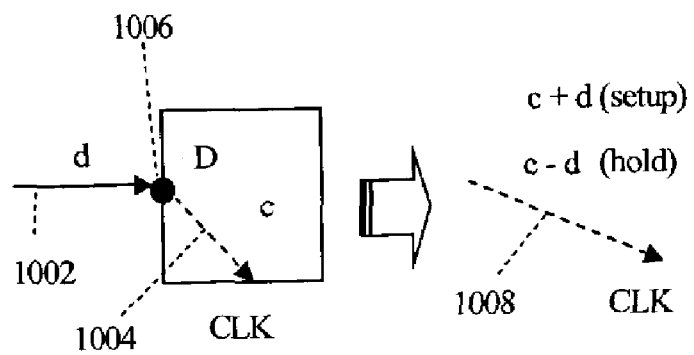
FIG. 10 shows a backward s-merge operation according to an embodiment of the invention.

FIG. 10 illustrates the backward s-merge operation. This figure shows the timing graph for a register in which a check arc 1002 and a delay arc 1004 meet at an input pin 1006. The backward s-merge operation is used to reduce this timing graph by merging the two arcs and removing the input pin 1006. The merged arc 1008 is a check arc having the check value c+d for setup group and c−d for hold group.

Self-Loop Check Arcs

There are certain "self-loop" check arcs where both the signal end and the reference end point to the same pin. Such timing checks include, but are not limited to, minimum pulse width (MPW) and minimum period (MP) checks on clocks.

By using forward and backward s-merge operations, such self-loop check arcs can be modeled with correct clock path delays (including asymmetrical rise/fall) and slew propagation.

Figure 11:
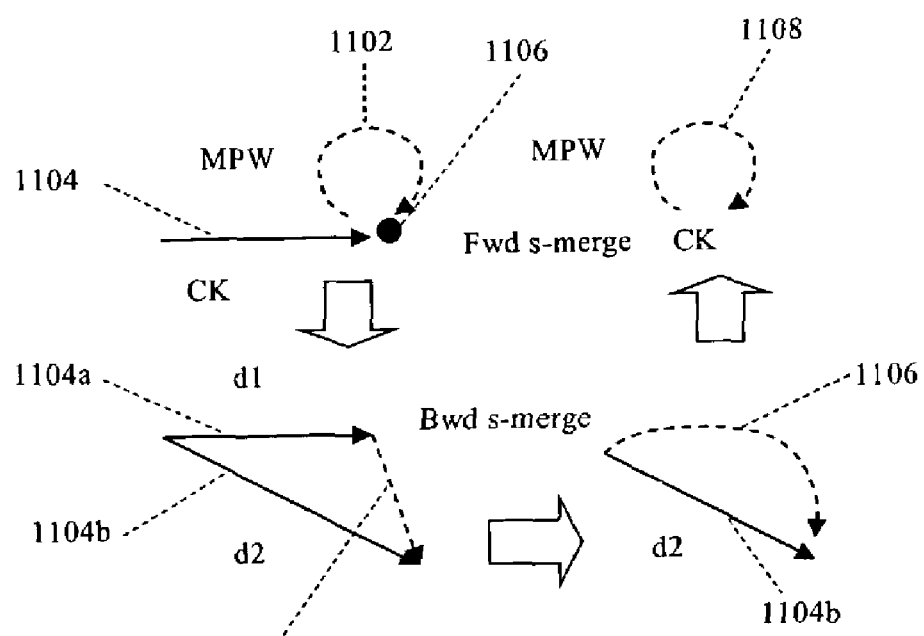
FIG. 11 illustrates processing of a self-loop check arc according to an embodiment of the invention.

FIG. 11 shows an example of a timing graph fragment for a clock path having a MPW self-loop check arc 1102. An incoming delay arc 1104 is shown connected to the same pin 1106 as both the signal and reference end of the self-loop check arc 1102.

Self-loop check arcs may be "expanded" as a check arc with no self-loop by conceptually duplicating the incoming delay arc. The delay arc 1104 is duplicated to produce two arcs d1 1104a and d2 1104b. By connecting each end of arc 1102 to the duplicated arcs 1104a and 1104b, the check arc 1102 is transformed such that it is longer a self-loop arc.

Thereafter, a backward s-merge can be performed on delay arc d1 1104a and the check arc 1102 to produce a merged check arc 1106. Then, a forward s-merge operation is performed on delay arc d2 1104b and check arc 1106. This leads to another self-loop check arc 1108 at port CK that correctly reflects the clock path delay and the slew propagation. Note that no delay arcs or pins need actually be duplicated here. The duplication in FIG. 11 is for the sake of exposition only.

Delay Calculations and Load Characterizations

In one embodiment, delay calculations are performed during s-merge and p-merge operations in which delays are computed over a fixed range of slew, load, and/or data values. For example, load ranges can be utilized for delay arcs which terminate at output ports. The ranges may vary from one delay arc or check arc to the other.

It is desirable for accurate ranges of load and slew values be obtained. For table-based libraries (such as TLF, .lib, or ALF), the ranges can be obtained as specified in library templates. For equation-based libraries (such as OLA) the ranges can be characterized. The following sections describe embodiments of approaches for obtaining slew/load range values.

For table-based libraries, the load ranges can obtained by looking at the table templates associated with the delay arc. Consider a delay arc with the following template(e.g., from a TLF library):

```
Timing_Model("Model0"
    (Spline
        (Input_Slew_Axis
    0.0500, 0.3000, 0.5500, 0.8000, 1.0500)
        (Load_Axis
    0.0820, 0.1639, 0.3279, 0.6557, 1.3115, 2.6230, 5.2459)
            data( )
        )
    )
```

The initial load range for this template consists of the following 7 values:

0.0820, 0.1639, 0.3279, 0.6557, 1.3115, 2.6230, 5.2459

An approach to determining the slew/load ranges is to establish a tolerance value to specify a desired accuracy value for the range. In this approach, every value in the initial range is evaluated to check if it can be dropped while meeting the desired accuracy level. Once a value is dropped from the range, the delay and the output slew values need to be interpolated using the points from its neighbors. If the interpolated delay and output slew values are within the specified tolerance limit, a value can be dropped from the range. The higher the tolerance percentage in this approach, the more values can be removed from the range. This approach reduces both the input slew values as well as the output load values to process.

For equation-based libraries, iterative weighted bi-sectioning technique can be used. The process starts with an initial range {0, Max Val}. Max Val can be the maximum output load or input slew value and can be specified by the user. The range is split into two ranges at midpoint. Then, out of all the existing sub-ranges, the one with more weight is selected. The weight is the gradient in output delays (or output slews) between the two endpoints of the range. This bi-sectioning continues until the desired number of data points are obtained. Once a range has been determined, it can be further reduced by tolerance-based pruning proposed for table-based libraries.

In another approach, if the number of load values in a range exceeds the maximum number of output load (N), then the range can be pruned by selecting N values with highest distances to adjacent neighbors. If the range is sorted in ascending order, the distance for the (i)th value in the range is found by the difference in load values between the (i+1)th value and the (i−1)th value. The distance for the first value in the range is assumed to be infinity and the distance for the last value half of infinity. This is to give higher weights to end points (highest weight is given to the first value in the range). Suppose N=6 for the above example. The distance table is shown as follows:

| Load Value | 0.0820 | 0.1639 | 0.3279 | 0.6557 | 1.3115 | 2.6230 | 5.2459 |
|---|---|---|---|---|---|---|---|
| Distance | Inf | 0.2459 | 0.4918 | 0.9836 | 1.9673 | 3.9344 | Inf/2 |

By picking 6 values with highest distances, the range can be pruned to 0.0820, 0.3279, 0.6557, 1.3115, 2.6230, 5.2459

Multiple Fanin and Fanout Considerations

Input ports may lead to reconvergent paths and this can create problems in p-merge if delay tables associated with reconvergent paths have different slew ranges. Likewise, output ports may have multiple fanin paths arising from designs containing multiplexors. For this reason, it is appropriate to use the same slew range for all delay arcs and check arcs emanating from an input port and the same output load range for all delay arcs terminating at an output port. The ranges may differ from one input/output port to the other. To accommodate this, the slew(load) ranges are characterized for all delay arcs and check arcs which emanate from (terminate at) input(output) ports. Then, all the slew/load values are merged into a list for each input/output port.

Check Arc Considerations

The BFS traversal approach of the present embodiment ensures that all the input delay arcs to a pin have already been processed before the pin is removed. Check arcs, however, sometimes need special consideration since, to completely characterize a check arc, a range of slew values should be available at both the signal end and the reference end. In some circumstances, the BFS traversal does not guarantee that both the signal end and the reference end of all check arcs are processed before forward s-merge or backward s-merge operations.

Figure 13:
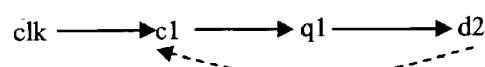
FIG. 13 shows a timing graph portion requiring a special processing for check arcs.

For example, consider the timing graph of FIG. 13. When pin c1 is removed, the range of slew values coming from the signal end (d2) of the check arc is not available. In one embodiment, the check arc is characterized with respect to all possible slew values (in most cases, fewer than 6 slew values are sufficient to characterize a check arc). Later when pin d2 is processed, the check arc is re-characterized for appropriate slew values. In an alternate embodiment, the range of slew values at d2 after removal of c1 is estimated. Only when pin d2 is processed does the slew range becomes available. Then, the check arc delay can be recomputed by performing interpolation.

Insertion Delays

An insertion delay refers to a delay from a clock source port to internal clock pins that belong to registers and latches. Insertion delay enables the characterization of fast (early) and slow (late) paths through a clock tree embedded within a cell. To compute insertion delays, additional computation can be performed at internal clock pins. In one embodiment, the insertion delay is computed when the process encounters a clock pin at a register or latch. The following is pseudocode to compute the insertion delay in one embodiment of the invention:

```
/* pin is an internal clock pin for a register or a latch */
computeInsertionDelay(pin) {
    paths = tracePathsToClockSourcePin(pin);
    for each path in paths {
        addInsertionDelay( src pin of path, path);
    }
}
```

A path is a list of delay arcs. The addInsertionDelay( ) procedure computes a path delay and stores that to the path originating pin which is the clock source port. The s-merge and p-merge operations described earlier can be used in this routine. In effect, when a clock pin for a latch or register is encountered, the process traces paths all the way back to the original clock source and tracks the one pin with the worst-case behavior.

Reduction Example

Figure 14:
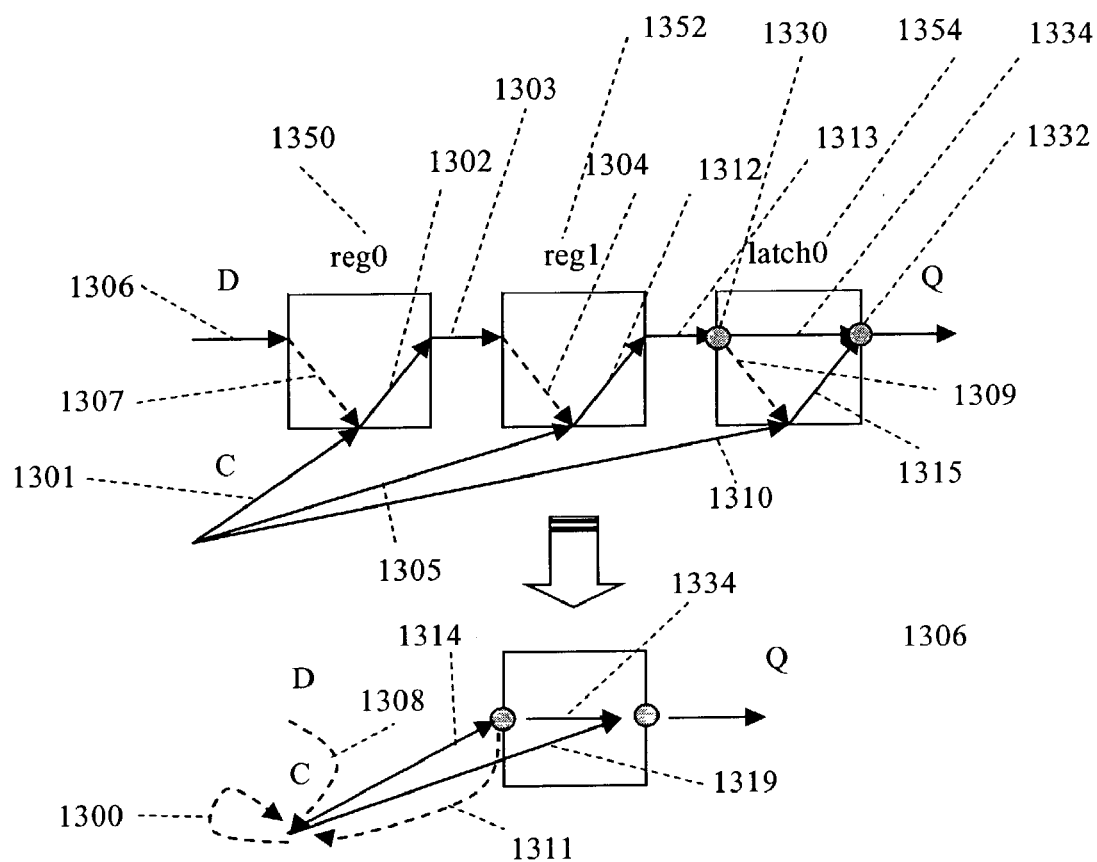
FIG. 14 illustrates an example of graph reduction on a circuit having two registers and a latch according to an embodiment of the invention.

FIG. 14 illustrates an example of graph reduction on a circuit with two registers 1350, 1352 and one latch 1354. In this example, arcs 1306 and 1307 are merged into check arc 1308 using the backwards s-merge operation. Arcs 1301, 1302, 1303, 1304, and 1305 are merged into self-loop check arc 1300 using a combination of s-merge, backward s-merge, and forward s-merge operations. Arcs 1309 and 1310 are merged into arc 1311 using the forward s-merge operation. Arcs 1305, 1312, and 1313 are merged into arc 1314 using the s-merge operation. Note that arc 1305 was involved in two separate sets of operations that resulted in both arcs 1300 and 1314 in the final timing model. Arcs 1310 and 1313 are merged into arc 1319 using the s-merge operation.

Since pins 1330 and 1332 are the input and output pins for a latch 1354, they are not removed from the model. The final model includes the two internal pins 1330 and 1332 to preserve the latch behavior. Note that the setup/hold checks on reg1 1352 are modeled as self-loop setup/hold check arcs on clock C.

Model Writer

This section describes an embodiment of a process and mechanism for writing the timing model. The model writer mechanism traverse or walks the reduced model graph to dump out the pins, the delay arcs and the check arcs in the desired format.

To reduce model size, the timing models can be shared among different delay arcs and check arcs. In one approach, this is accomplished by hashing delay tables. In addition, model size can be reduced by sorting and reducing delay tables. Although slew values can be sorted and duplicates removed in the model graph reducer, some final tuning may be needed if the model reducer misses some optimization because it considers all transition possibilities (rise, fall, early, late). Given the values in the delay table, the model writer mechanism can examine the slew values which appear in the axis and perform sorting and removal of duplicates.

As described in more detail elsewhere, the model writer mechanism can: a) preserve all internal pins associated with exceptions; b) store exceptions at model I/O ports to dummy internal pins; and, c) write out new exceptions as part of the model. This facilitates the preservation of assertions and constraints since exceptions are incorporated into timing model. In one embodiment, only user assertions which are present on the original circuit will be written as part of the model.

Assertion Handler

This section describes how assertions are processed for model extraction in one embodiment of the invention. For purposes of explanation, assertion handling is described in the context of graph reduction for model extraction and in the context of internal pins. However, it is noted that the present inventive concepts for handling assertions are equally applicable to other model extraction approaches and non-internal pins, e.g., handling assertions for path-tracing for black box models, and thus is not to be limited to the specific embodiment(s) disclosed herein for illustration, and for extraction from different sources of data, e.g., extracting the-timing model from a netlist, timing graph, etc.

Examples of "generated assertions", which are assertions that come from tools such as a budgeter include the following:
  clock arrival time
  clock required time
  data arrival time
  data required time
  slew time
  constants for timing
  drive resistance
  drive cell
  input delay
  output (external) delay Examples of "user assertions", which are assertions set by the user include the following: false path, multicycle path, or disable timing.

One of the problems in known model extracting approaches is that original assertions/constraints are difficult to apply to the extracted model. The loss or name mutation of internal pins contributes to this difficulty.

Figure 15:
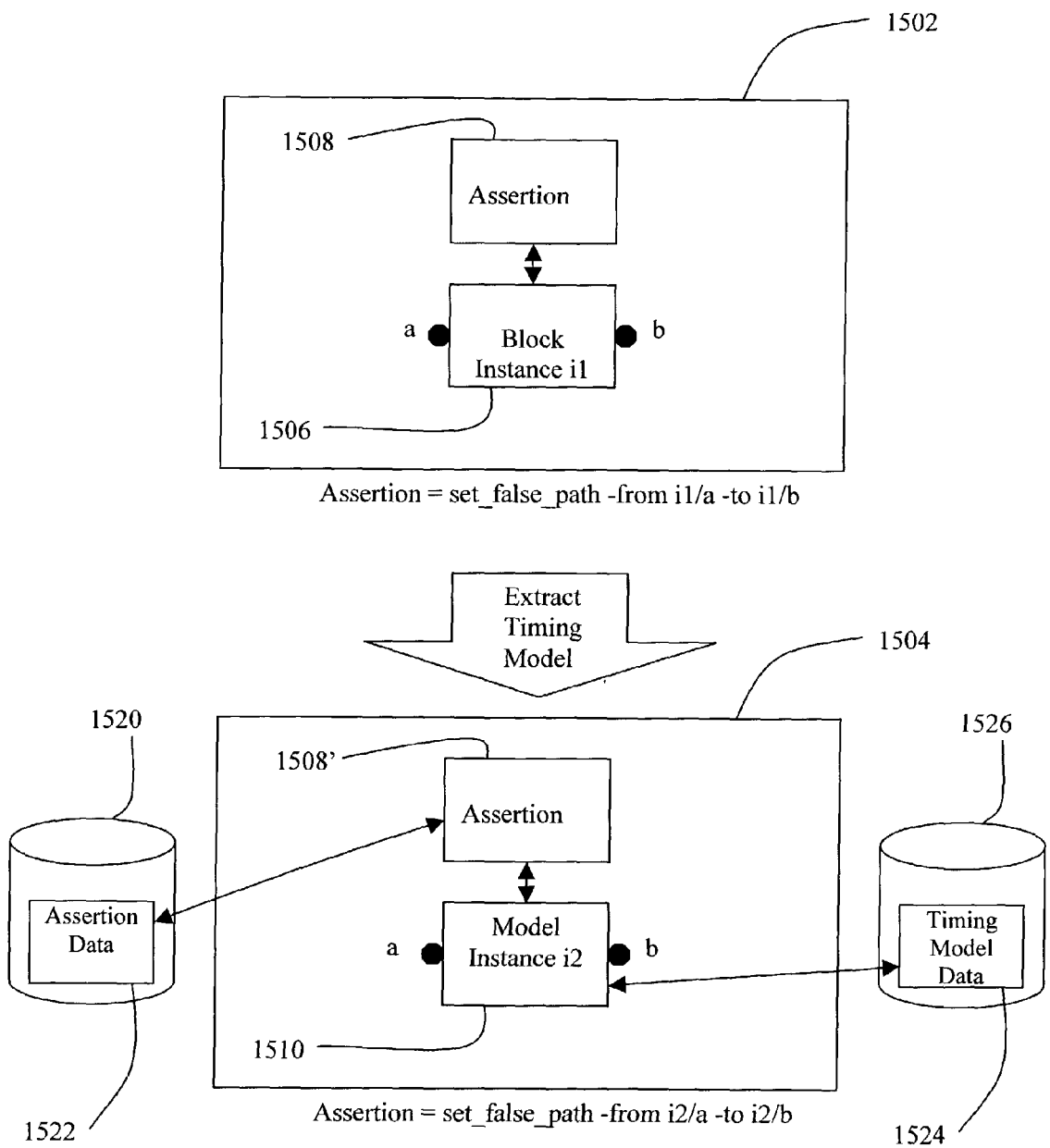
FIG. 15 depicts one approach to assertion handling for model extraction.

FIG. 15 illustrates this drawback of the known approaches. Consider an original netlist 1502 having a circuit block 1506 instantiated as an instance i1 with pins a and b. An assertion 1508 at the top level exists as follows: "set_false_path-from i1/a-to i1/b". If an extracted timing model is instantiated in a different instance, the assertions need to be changed or sourced in a different manner to reflect changes in pin names. In conventional model extractors, a manual process is employed to ensure proper association of the assertion 1508 to the extracted model 1510. In this example, the assertion 1508 would be converted to a revised assertion 1508' as follows:

set_false_path -from i2/a -to i2/b

Since a typical circuit design contains a very large number of circuit elements (potentially numbering in the millions), and these elements must be searched and reviewed to ensure that assertions are properly associated with corresponding elements, it is evident that any process that relies upon manual correction and association of assertions would be a tedious and time-consuming procedure that is fraught with potential for introducing or overlooking errors. In addition, once the assertions has been corrected, they would be stored in a separate storage location 1522 from the storage location 1526 for the timing model 1524. This means that at least two separate data storage locations would have to be accessed to retrieve the model information for a timing model portion.

To address these problems in one embodiment of the invention, internal pins associated with assertions are retained. This allows the original assertions to be applied to the model with no or little modification, including assertions that span multiple blocks. Also, the present approach makes it easy to preserve and apply the original timing constraints/assertions. The timing constraints/assertions are viewed as part of the model, and a set of new constraints can be generated automatically as part of the model extraction process. The support for timing constraints is important for top-down hierarchical flows.

FIG. 16 illustrates an embodiment of the invention. Here, the timing graph portion 1602 includes a circuit block between pins a and b. An assertion 1608 exists similar to the previous example: "set_false_path-from a-to b". However, when model extraction is performed, pins a and b are purposely excluded from removal, renaming, or other change since assertion 1608 has been identified as being associated with these pins. Thus, pins a and b are retained in the extracted model graph 1610. This approach inherently preserves the validity and applicability of the original assertion 1608 to the corresponding pins a and b in the extracted model.

Moreover, the assertions can be automatically written and placed into the model graph 1610 and timing written out to the timing model 1624. This information can be stored, for example, as a cell-level attribute in the timing model. The stored version of the timing model 1624 therefore includes both timing data as well as associated assertion data corresponding to the timing model. The model more accurately ensures the integrity of original assertions. Assertions become part of the model and are applied automatically when model is read in.

Figure 17:
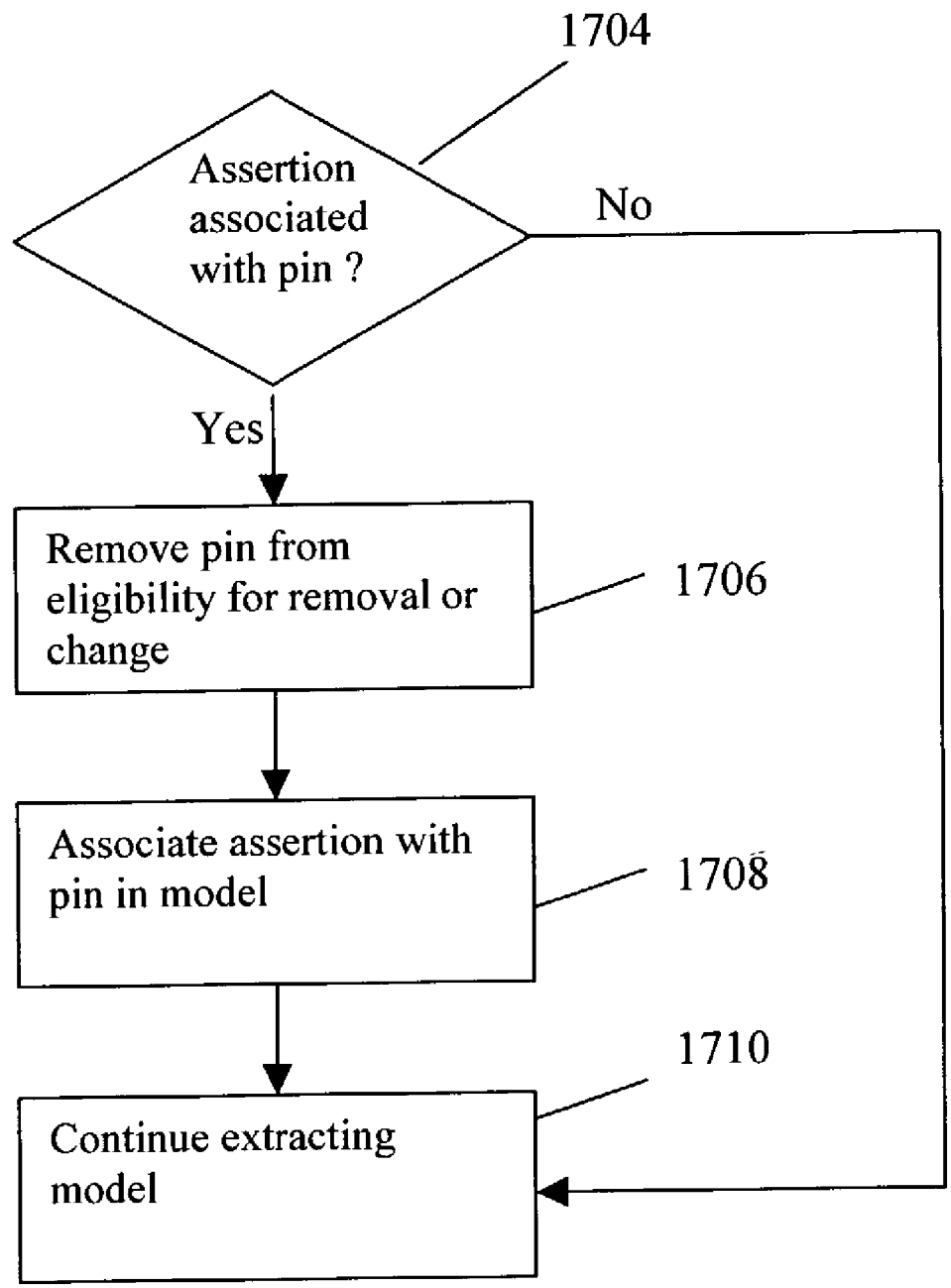
FIG. 17 shows a flowchart of an embodiment of a process for assertion handling.

FIG. 17 shows a flowchart of an embodiment of a process for processing assertions. At 1704, a determination is made whether a particular pin is associated with an assertion. If so, then the pin is retained and is removed from eligibility for removal (1706). At 1708, the identified pin is associated with the assertion such that when the model is written, the assertion is automatically embedded into the model. At 1710, the normal model extraction process continues.

Figure 18:
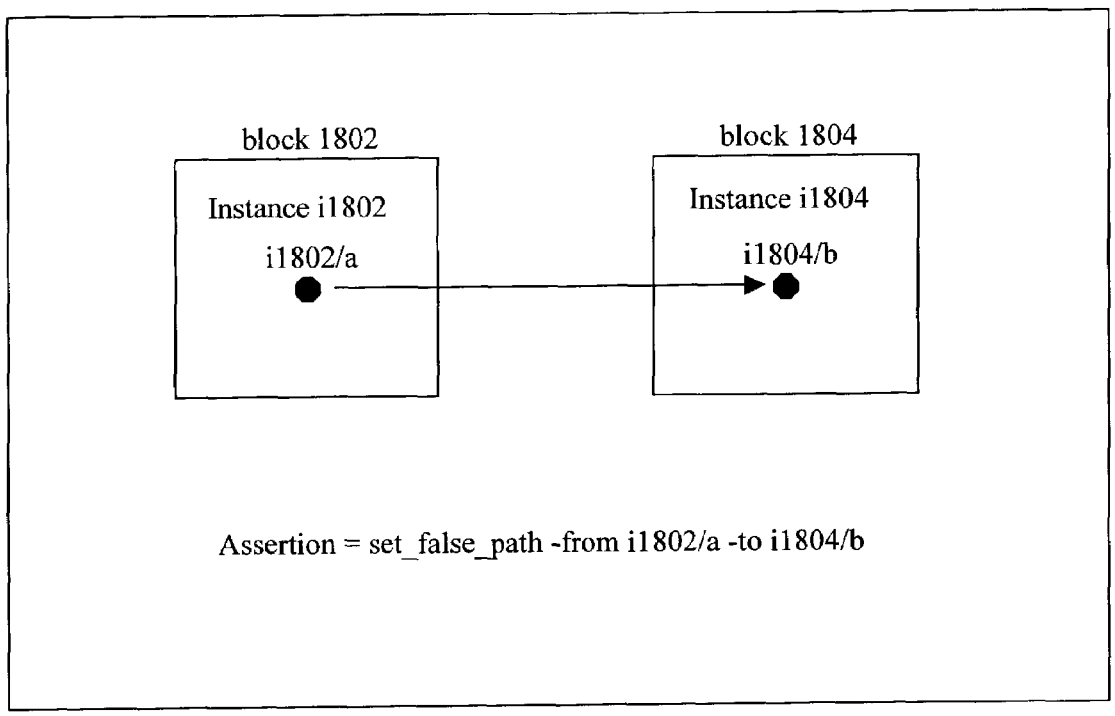
FIG. 18 illustrates an approach for handling assertion across multiple blocks according to an embodiment of the invention.

Referring to FIG. 18, consider the situation when an assertion spans multiple blocks. Shown are two blocks 1802 and 1804 with a first pin i1802/a in block 1802 and a second pin i1804/b in block 1804. Assume that an assertion exists as follows: "set_false_path-from i1802/a-to i1804/b".

In the present embodiment, assertions that extend between multiple blocks cause all associated pins in the respective blocks to be retained in the timing model. Thus, pins i1802/a and i1804/b would be retained during the model extraction process for blocks 1802 and 1804. As with the situation involving pins for a single block, this approach of retaining assertion-related pins for multiple blocks help to ensure that timing behavior will be appropriately preserved during model extraction. The assertion information is automatically written to the timing model after extraction. In one approach, if assertions span more than one block, then user may not make changes to such assertions after the model is read in.

Hierarchical Pin Assertions

There may be at least two types of pins that appear in a circuit: instance pins and hierarchical pins. The hierarchical pin establishes a hierarchical boundary; when a signal crosses a hierarchical pin, it moves from one hierarchy to another. Hierarchical pin is a place holder for boundary crossing information and has no underlying physical pin representation.

Assertions may be associated with hierarchical pins as well as instance pins. For many timing tools, hierarchical pins may not appear when a timing graph is built. This may present a problem if there is an assertion associated with hierarchical pins. In one embodiment of the invention, if assertions are associated with hierarchical pins, the timing graph is modified to insert newly created internal pins for the hierarchical pins, and the assertions are re-expressed in terms of these new pins. This mapping is used to support different types of assertions in full generality. Zero delay arcs that preserve slews (i.e., output slew=input slew) extend to or from these new "dummy" internal pins.

Figure 19A:
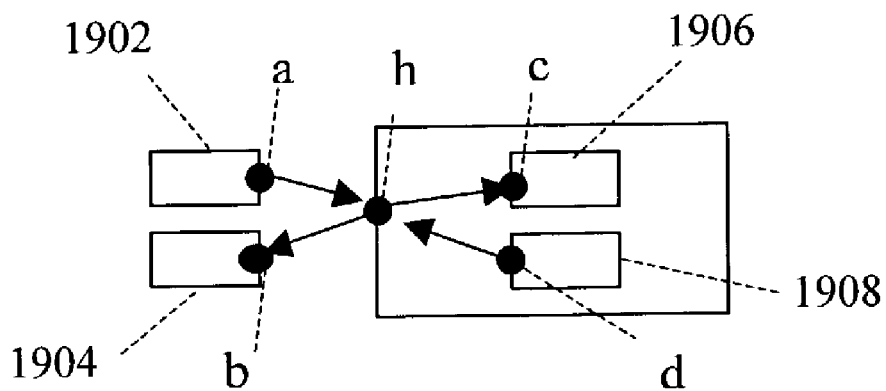
FIGS. 19a-c and 20a-b illustrate an embodiment of a process for addressing hierarchical pin assertions for model extraction.

Consider the example circuit shown in FIG. 19a. Each rectangle in the figure represents an instance. Shown are instances 1902, 1904, 1906, and 1908. Pins are represented as black dots. shown are instance pins 'a', 'b', 'c' and 'd'. Pin 'h' is a hierarchical pin.

Figure 19B:
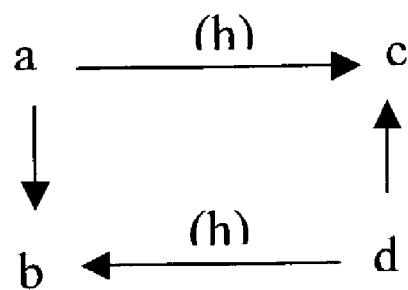

The timing graph for this circuit is shown in FIG. 19b. Here, hierarchical pin 'h' can be accessed through two delays a->c and d->b.

Consider if there is a through pin assertion on pin 'h' as follows:

set_false_path-from a-through h-to c

Figure 19C:
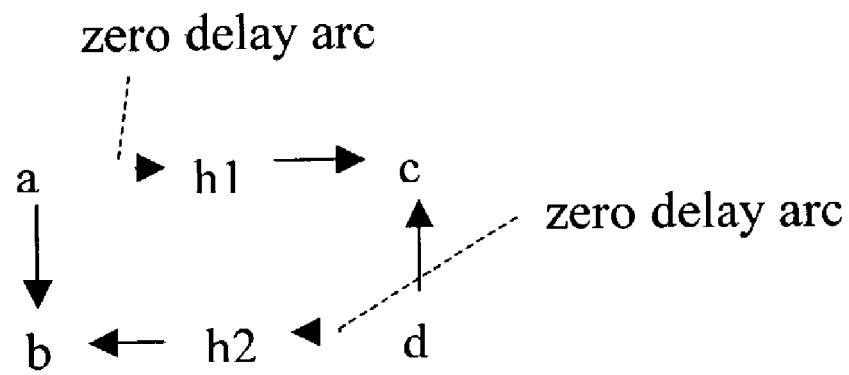

To capture this assertion in the extracted model, two new internal pins are introduced in the model. These new pins can be considered "dummy" internal pins. In this example, two pins are used because a->b and a->c delays may differ from d->b and d->c delays. The expanded timing graph with the new internal pins 'h1' and 'h2' looks as shown in FIG. 19c. When new pins h1 and h2 are introduced, new arcs a->h1 and d->h2 are also introduced. Note that in this example, a->h1 and d->h2 denote zero-delay arcs. h1->c and h2->b delays are the same as a->c and d->b delays in the original timing graph, respectively.

Since pin 'h' is split into two pins 'h1' and 'h2', the original assertion is transformed to the following:

set_-false_path-from a through h1-to c set_false_path-from a-through h2-to c

Two actions involved in supporting hierarchical pin assertions are: 1) timing graph expansion and 2) model assertion writer.

Timing graph expansion refers to the process of inserting new internal pins in the timing graph to correctly capture hierarchical pin assertions. This can be done by iterating through all the delay arcs and searching for hierarchical pins that have assertions. If such hierarchical pins are found on a delay arc, then a greedy "find or create" strategy can be used to expand the timing graph. FIG. 12 gives a pseudo code for such a process. There are two mapping tables in the code:

1. 'map_table' maps a hierarchical pin to one or more newly created internal pins (one-to-many mapping). This is used in the model assertion writer.
2. 'visited' maps a hierarchical pin to the most recently created internal pin (one-to-one mapping).

Figure 20A:
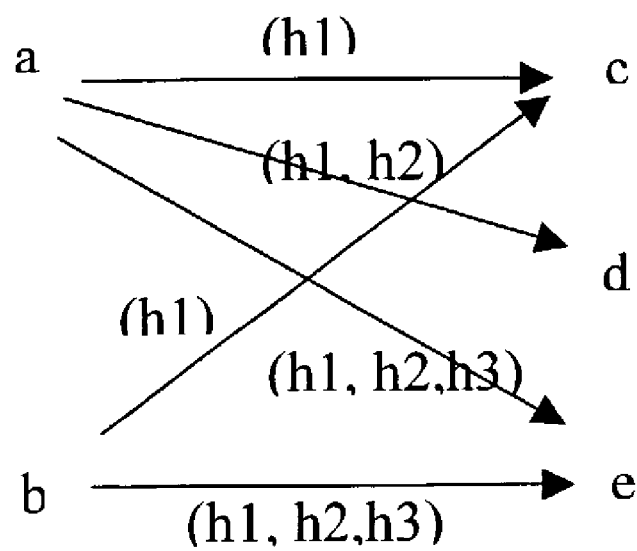
Figure 20B:
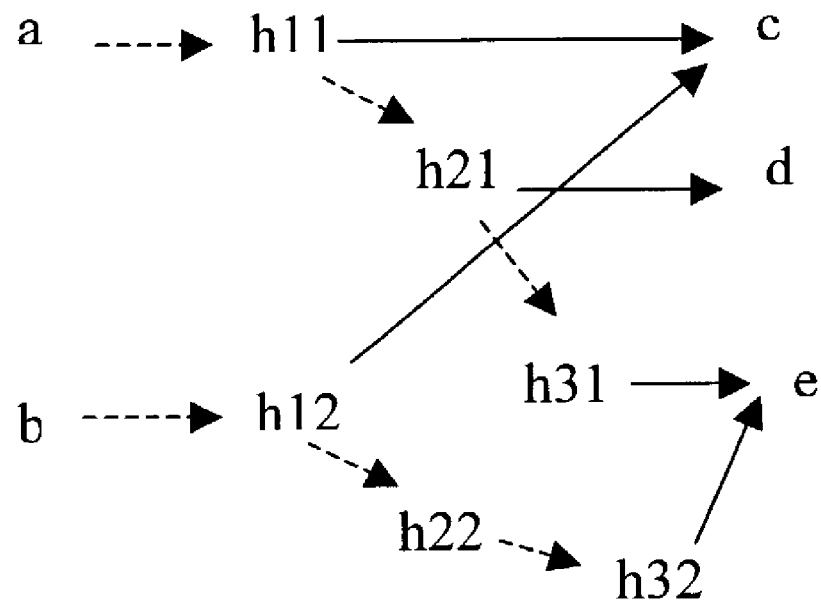

Consider the timing graph shown in FIG. 20a. The hierarchical pins are shown in parentheses on the delay arcs. After timing graph expansion, the new timing graph becomes as shown in FIG. 20b.

The contents of the map_table for this example is as follows:
   h1: h11, h12
   h2: h21, h22
   h3: h31, h32

The model assertion writer refers to the mechanism for traversing the model data and writing the assertion information associated with pins in the model. If hierarchical pin assertions are not supported, then the assertion writer can simply traverses all of given hierarchies and writes out assertions at all module ports and all instance pins. In one embodiment, no global assertions such as clock definitions are written, e.g., because in certain circumstances, such assertions may lead to an infinite loop during the build of the model. Also, in an embodiment, no electrical port assertions are written.

Implementing hierarchical pin assertions may result in the change of pin names as well as the creation of additional assertions. Both of these actions can be performed using the mapping table from the previous action of expanding the timing graph. For example, a callback function can be defined to perform this action similar to how it can be done for sourcing assertions.

Consider the following assertion where pin 'a' is a hierarchical pin which is split into two internal pins 'a1' and 'a2'.

set_false_path-from a-to b

The assertion writer maps this assertion to the following assertions:

set_false_path-from a1-to b set_false_path-from a2-to b

Port Assertions

Special considerations may be taken with respect to assertions on I/O ports. It is often desirable for the assertions associated with the model to be sourced automatically when the model is used and removed automatically when the model is removed or replaced. In certain circumstances, the assertions on I/O ports make the removal process difficult. For this reason, in one embodiment, the assertions on I/O ports are moved to internal pins using a similar graph expansion technique of the previous section. This allows to model not to have assertions directly attached to input and output ports, making the model more self-contained.

For assertions on an input port or a bidi input part, a new "dummy" internal pin is created for this input port and the input port assertion is transferred to this pin. The new internal pin drives all the pins that were driven by the input port and is driven by the input port through a zero-delay arc. Also, all check arcs associated with the input port are now associated with the new internal pin.

Figure 21A:
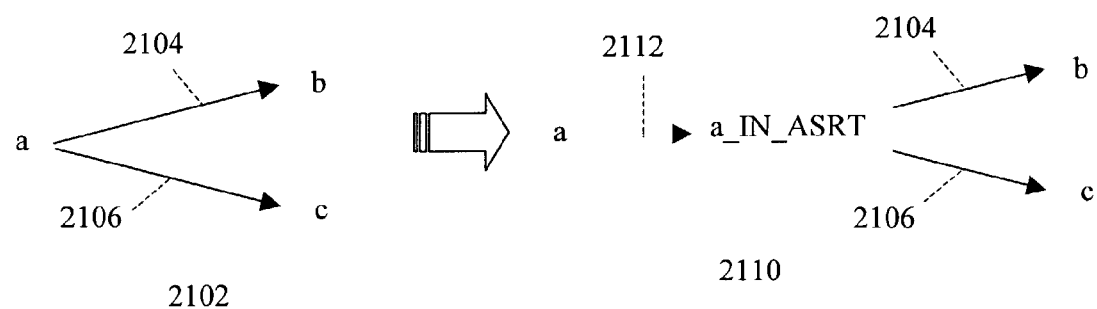
FIGS. 21a-b illustrate an embodiment of a process for addressing assertions at input or output ports.

An example of this expansion is shown in FIG. 21a. Here, the original graph 2102 includes an input port a having arcs 2104 and 2106 to pins b and c, respectively. Assume that there is an assertion associated with port a. The modified graph 2110 includes a new internal pin "a_IN_ASRT" associated with arcs 2104 and 2106. The assertion that was associated with port a is now associated with pin a_IN_ASRT. A new arc 2112 is created that extends from pin a to pin a_IN_ASRT. This new arc is created with a zero delay value such that output slew is the same as input slew.

Assertions on an output port or a bidirectional output part are handled in a similar manner. An internal pin is created such that all the delay arcs feeding the output port now feed the internal pin. To preserve the dependency on output load at the port, three-dimensional tables are created for all delay arcs coming into the new internal pin.

Figure 21B:
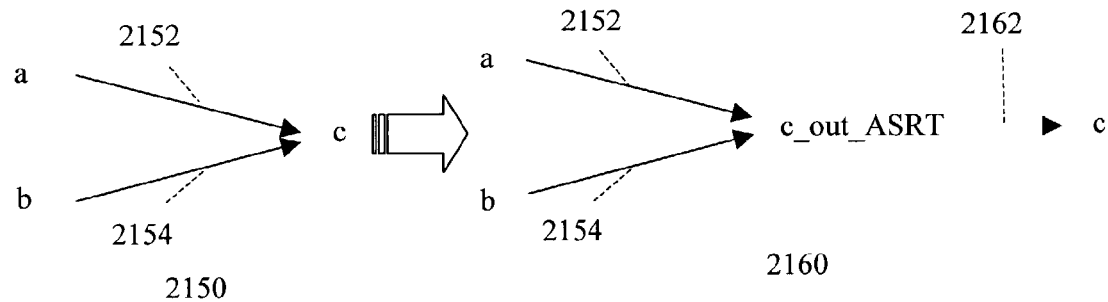

Consider the example shown in FIG. 21b. The original timing graph 2150 has a delay arc 2152 extending from pin a to output pin c and a delay arc 2154 extending from pin b to output port c. The modified graph 2160 includes a new pin 'c_OUT_ASRT', which is the new internal pin to which the port assertions are transferred. A new zero delay arc 2162 is created from pin c_OUT_ASRT to the output port c such that output slew is the same as input slew. Note that the arc 2152 from pin a to in c_OUT_ASRT and the arc 2154 from pin b to pin c_OUT_ASRT can be associated with three-dimensional delay table(s) to capture the load dependency at port c.

What is claimed is:

1. A method for assertion handling for timing model extraction, comprising:
   receiving a circuit design;
   identifying one or more pins of the circuit design associated with an assertion;
   extracting a timing model from a timing graph of the circuit design that automatically preserves the integrity of the assertion; and
   storing the extracted timing model.

2. The method of claim 1 in which the assertion is preserved by retaining the one or more pins in the timing model.

3. The method of claim 2 in which the assertion spans multiple blocks.

4. The method of claim 1 in which the assertion comprises a hierarchical pin assertion, wherein an assertion is associated with one or more hierarchical pins.

5. The method of claim 4 in which a new internal pin is created.

6. The method of claim 5 in which a zero delay arc is created extending from source of the arc to the new internal pin.

7. The method of claim 5 in which a slew-preserving arc is created extending from source of arc to the new internal pin.

8. The method of claim 5 in which a new arc having same delay characteristics of the arc is created, the new arc extending from the new internal pin to sink of arc.

9. The method of claim 5 in which a mapping structure is maintained to map hierarchical pins to new internal pins.

10. The method of claim 4 in which a mapping structure is maintained to track already-processed hierarchical pins per source pin basis.

11. The method of claim 5 in which the hierarchical assertion is re-expressed in terms of the one or more new internal pins.

12. The method of claim 1 in which the one or more pins is identified.

13. The method of claim 1 in which the one or more pins is identified from a netlist.

14. The method of claim 1 in which the assertion comprises a port assertion.

15. The method of claim 10 in which the port assertion is associated with either an input port, output port, or bi-directional port.

16. The method of claim 10 in which a new internal pin is created that is associated with the port assertion.

17. The method of claim 16 in which a zero delay arc is created for the new internal pin.

18. The method of claim 16 in which a slew-preserving arc is created for the new internal pin.

19. The method of claim 16 in which a three-dimensional structure is employed to capture load dependency.

20. The method of claim 1 in which assertion information is stored in the timing model.

21. The method of claim 20 in which the assertion information is stored as a cell-level attribute in the timing model.

22. A method for assertion handling for timing model extraction, comprising:
receiving a circuit design;
identifying a location of the circuit design associated with an assertion;
extracting a timing model from a timing graph of the circuit design, wherein the timing model comprises a new location to be associated with the assertion;
automatically associating the assertion to the new location; and
storing at least the extracted timing model.

23. The method of claim 22 in which a new internal pin is created corresponding to the location associated with the location.

24. The method of claim 23 in which a dummy arc is created for the new internal pin.

25. The method of claim 24 in which the dummy arc is a zero delay arc.

26. The method of claim 24 in which the dummy arc is a slew-preserving arc.

27. The method of claim 23 in which the assertion is automatically transformed to correspond to creation of the new internal pin.

28. The method of claim 23 in which the new internal pin is retained in the timing model.

29. The method of claim 23 in which the location corresponds to a hierarchical pin assertion.

30. The method of claim 29 in which a mapping structure is maintained to map hierarchical pins to new internal pins.

31. The method of claim 23 in which the location correspond to a port assertion.

32. The method of claim 31 in which the port assertion is associated with either an input port, output port, or bi-directional port.

33. The method of claim 32 in which a three-dimensional mapping structure is employed to capture load dependency.

34. The method of claim 22 in which the timing model is extracted.

35. The method of claim 22 in which assertion information is stored in the timing model.

36. A system for assertion handling for timing model extraction, comprising:
means for receiving a circuit design;
means for identifying one or more pins of the circuit design associated with an assertion;
means for extracting a timing model from a timing graph of the circuit design that includes means for automatically preserving the integrity of the assertion; and
means for storing the extracted timing model.

37. A computer program product comprising a computer usable medium having executable code to execute a process for assertion handling for timing model extraction, the process comprising:
receiving a circuit design;
identifying one or more pins of the circuit design associated with an assertion;
extracting a timing model from a timing graph of the circuit design that automatically preserves the integrity of the assertion; and
storing the extracted timing model.

38. A system for assertion handling for timing model extraction, comprising:
means for receiving a circuit design;
means for identifying a location of the circuit design associated with an assertion;
means for extracting a timing model from a timing graph of the circuit design, wherein the timing model comprises a new location to be associated with the assertion;
means for automatically associating the assertion to the new location; and
means for storing at least the extracted timing model.

39. A computer program product comprising a computer usable medium having executable code to execute a process for assertion handling for timing model extraction, the process comprising:
receiving a circuit design;
identifying a location of the circuit design associated with an assertion;
extracting a timing model from a timing graph of the circuit design, wherein the timing model comprises a new location to be associated with the assertion;
automatically associating the assertion to the new location; and
storing at least the extracted timing model.

40. The system of claim 36 in which the assertion is preserved by retaining the one or more pins in the timing model.

41. The system of claim 36 in which the assertion comprises a hierarchical pin assertion, wherein an assertion is associated with one or more hierarchical pins.

42. The system of claim 36 in which the one or more pins is identified from a netlist.

43. The system of claim 36 in which the assertion comprises a port assertion.

44. The product of claim 37 in which the assertion is preserved by retaining the one or more pins in the timing model.

45. The product of claim 37 in which the assertion comprises a hierarchical pin assertion, wherein an assertion is associated with one or more hierarchical pins.

46. The product of claim 37 in which the one or more pins is identified from a netlist.

47. The product of claim 37 in which the assertion comprises a port assertion.

48. The system of claim 38 in which the assertion is preserved by retaining the one or more locations in the timing model.

49. The system of claim 38 in which the assertion comprises a hierarchical location assertion, wherein an assertion is associated with one or more hierarchical locations.

50. The system of claim 38 in which the one or more locations is identified from a netlist.

51. The system of claim 38 in which the assertion comprises a port assertion.

52. The product of claim 39 in which the assertion is preserved by retaining the one or more pins in the timing model.

53. The product of claim 39 in which the assertion comprises a hierarchical pin assertion, wherein an assertion is associated with one or more hierarchical pins.

54. The product of claim 39 in which the one or more pins is identified from a netlist.

55. The product of claim 39 in which the assertion comprises a port assertion.

56. The method of claim 1, wherein the extracted timing model is stored on a memory device.

57. The method of claim 22, wherein at least the extracted timing model is stored on a memory device.

58. The system of claim 36, wherein the extracted timing model is stored on a memory device.

59. The computer program product of claim 37, wherein the extracted timing model is stored on a memory device.

60. The system of claim 38, wherein at least the extracted timing model is stored on a memory device.

61. The computer program product of claim 39, wherein at least the extracted timing model is stored on a memory device.

* * * * *